US008939092B2

(12) United States Patent
Korb

(10) Patent No.: US 8,939,092 B2
(45) Date of Patent: Jan. 27, 2015

(54) TABLE SYSTEM

(76) Inventor: Daniel Korb, Baden (CH)

(*) Notice: Subject to any disclaimer, the term of this patent is extended or adjusted under 35 U.S.C. 154(b) by 276 days.

(21) Appl. No.: 13/248,384

(22) Filed: Sep. 29, 2011

(65) Prior Publication Data
US 2012/0073480 A1 Mar. 29, 2012

(30) Foreign Application Priority Data
Sep. 29, 2010 (DE) .......................... 10 2010 037 837

(51) Int. Cl.
| A47B 13/00 | (2006.01) |
| A47B 91/00 | (2006.01) |
| A47B 83/02 | (2006.01) |
| A47B 13/06 | (2006.01) |
| A47B 87/00 | (2006.01) |
| F16B 12/20 | (2006.01) |

(52) U.S. Cl.
CPC ............. *A47B 83/02* (2013.01); *A47B 13/06* (2013.01); *A47B 87/002* (2013.01); *F16B 12/20* (2013.01)
USPC .................................................... 108/158.13

(58) Field of Classification Search
USPC ............... 108/153.1, 155, 158.11–158.13
See application file for complete search history.

(56) References Cited

U.S. PATENT DOCUMENTS

| 2,380,379 | A | * | 7/1945 | Attwood | 248/163.1 |
| 4,163,537 | A | * | 8/1979 | Mourgue | 248/188.1 |
| 4,848,245 | A | * | 7/1989 | Piretti | 108/156 |
| 5,715,760 | A | * | 2/1998 | Frascaroli et al. | 108/50.02 |
| 5,899,423 | A | * | 5/1999 | Albertini | 248/188.8 |
| 6,024,024 | A | * | 2/2000 | Favaretto | 108/64 |
| 6,725,784 | B2 | * | 4/2004 | Crinion | 108/64 |
| 6,729,244 | B2 | * | 5/2004 | Cattaneo | 108/155 |
| 7,703,398 | B2 | * | 4/2010 | Brauning et al. | 108/50.02 |
| 7,765,937 | B2 | * | 8/2010 | Weissenrieder et al. | 108/50.02 |
| 2003/0167982 | A1 | * | 9/2003 | Yang | 108/155 |
| 2006/0278139 | A1 | * | 12/2006 | Korb | 108/155 |

FOREIGN PATENT DOCUMENTS

| DE | 1464058 U | 4/1939 |
| DE | 1936645 U | 4/1966 |
| DE | 3438853 A1 | 4/1986 |
| DE | 8513857 U1 | 1/1987 |
| DE | 4026750 A1 | 2/1992 |
| DE | 19725045 A1 | 12/1998 |
| DE | 19725060 A1 | 12/1998 |
| DE | 20102791 U1 | 5/2001 |
| EP | 0669092 A1 | 8/1995 |
| EP | 1330969 A1 | 7/2003 |

* cited by examiner

*Primary Examiner* — Darnell Jayne
*Assistant Examiner* — Timothy M Ayres
(74) *Attorney, Agent, or Firm* — Taft Stettinius & Hollister LLP; Brian Lynch

(57) ABSTRACT

Provided is a table system that allows for multiple table frame arrangements using various combinations of fundamental building pieces. An adjustable height table leg includes two parallel and horizontal slots adapted to receive and clamp two independent frame members of the frame. The frame members may be bent or angled in a plurality of configurations to achieve a desired shape for the table frame. Sections of the frame members may also include apertures through which fasteners may be threaded to connect two frame members at right angles.

19 Claims, 29 Drawing Sheets

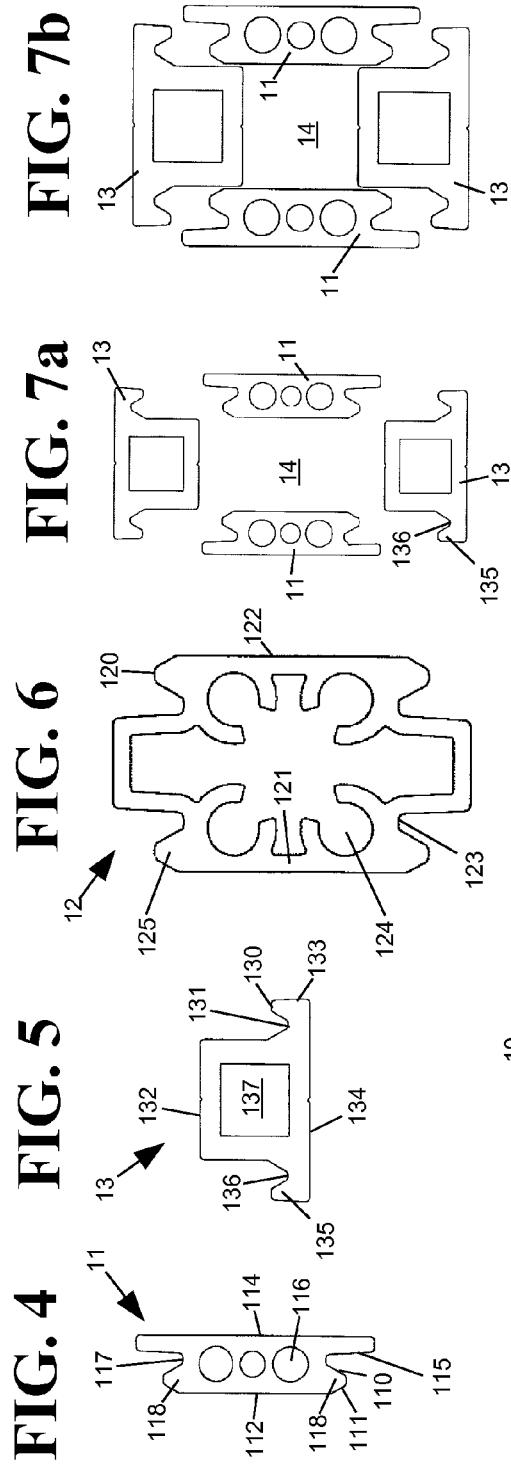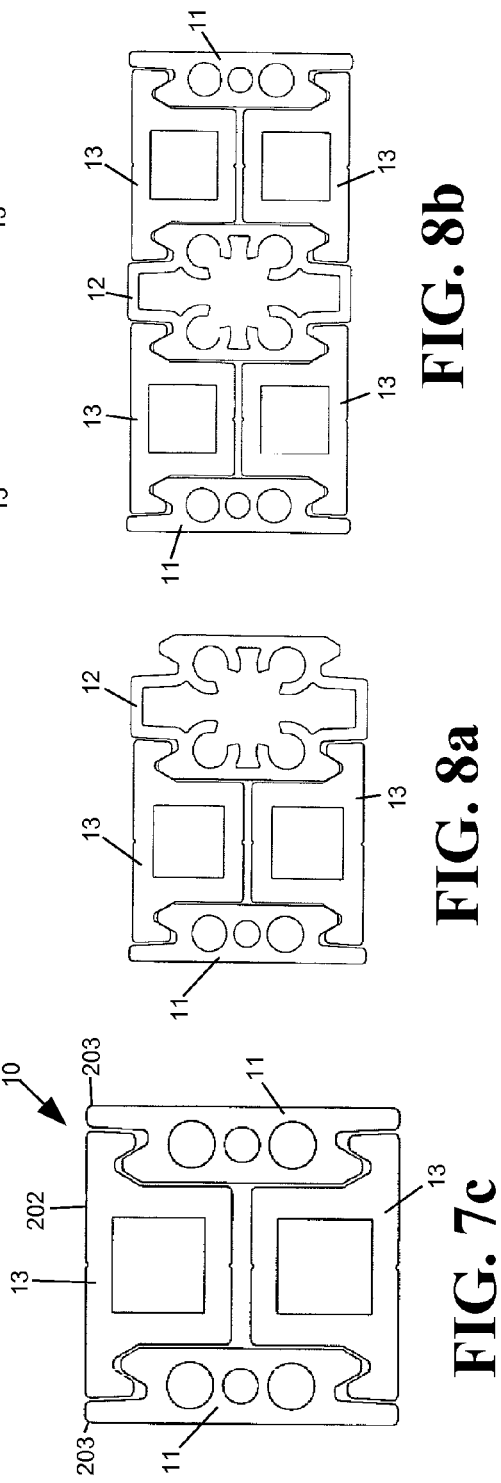

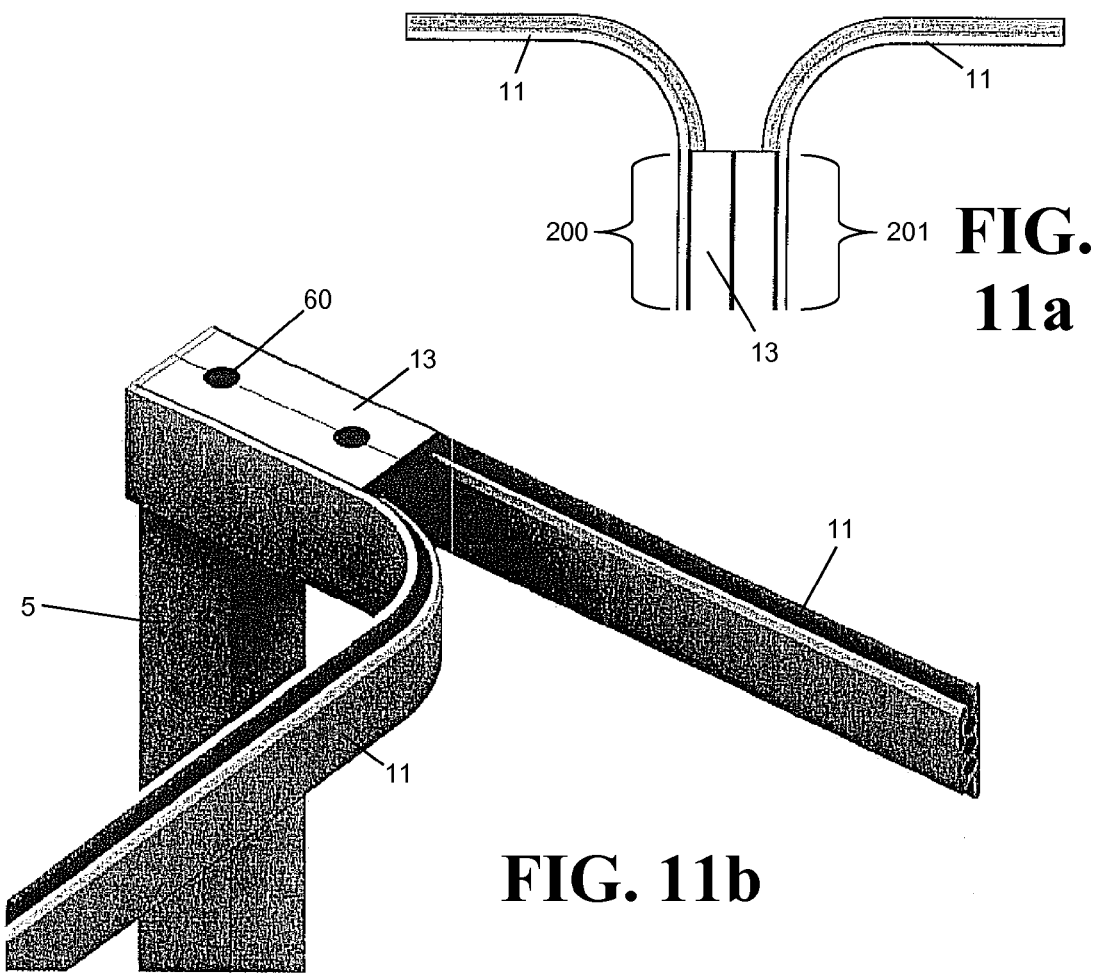
FIG. 11a
FIG. 11b
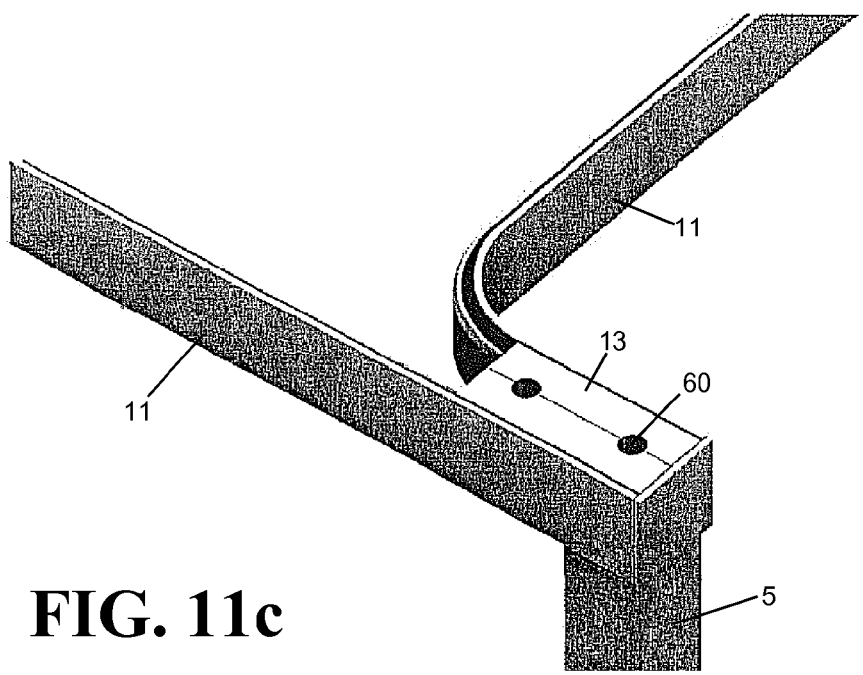
FIG. 11c

FIG. 12a
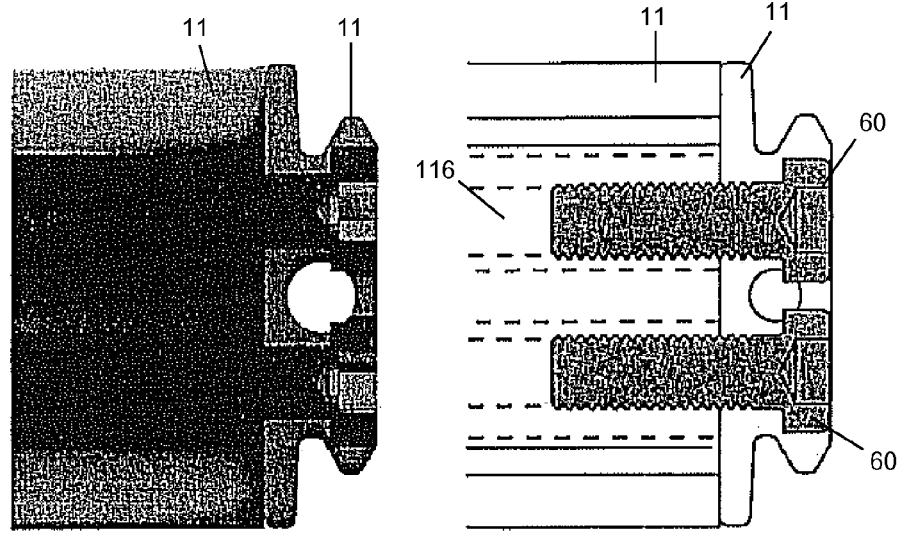
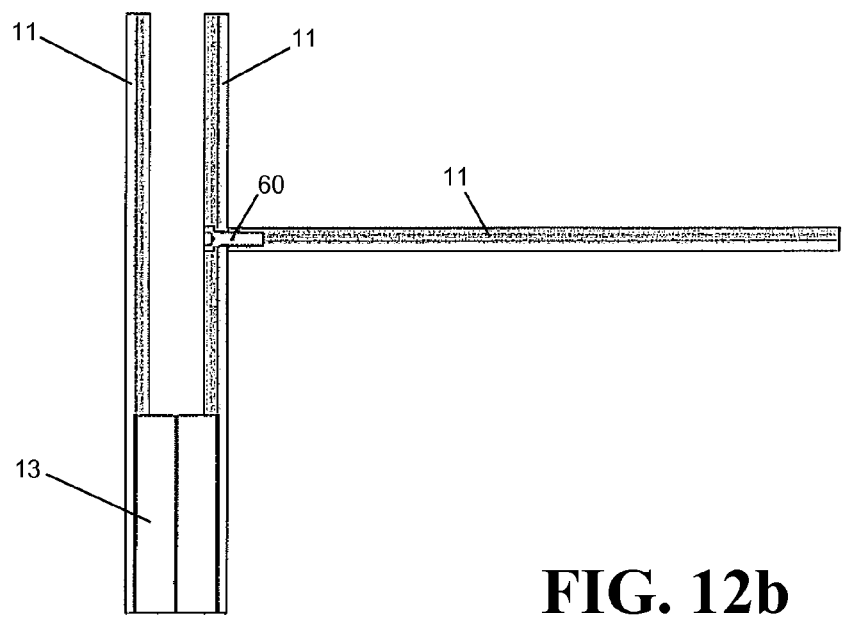
FIG. 12b

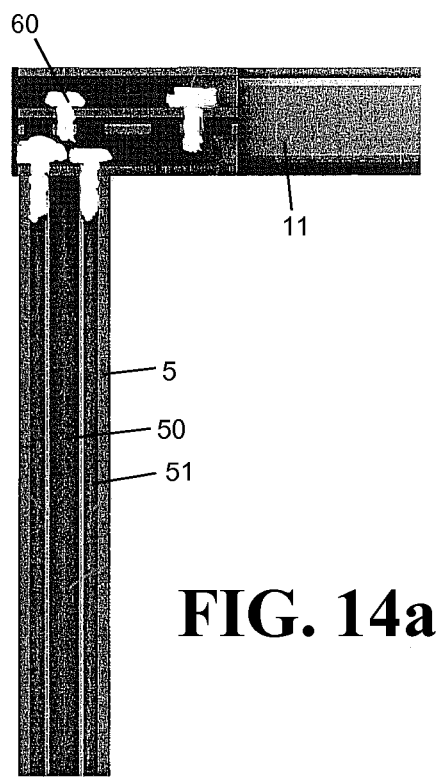
FIG. 14a
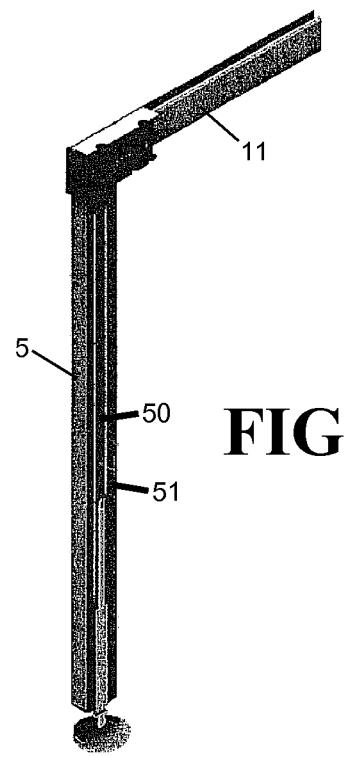
FIG. 14b
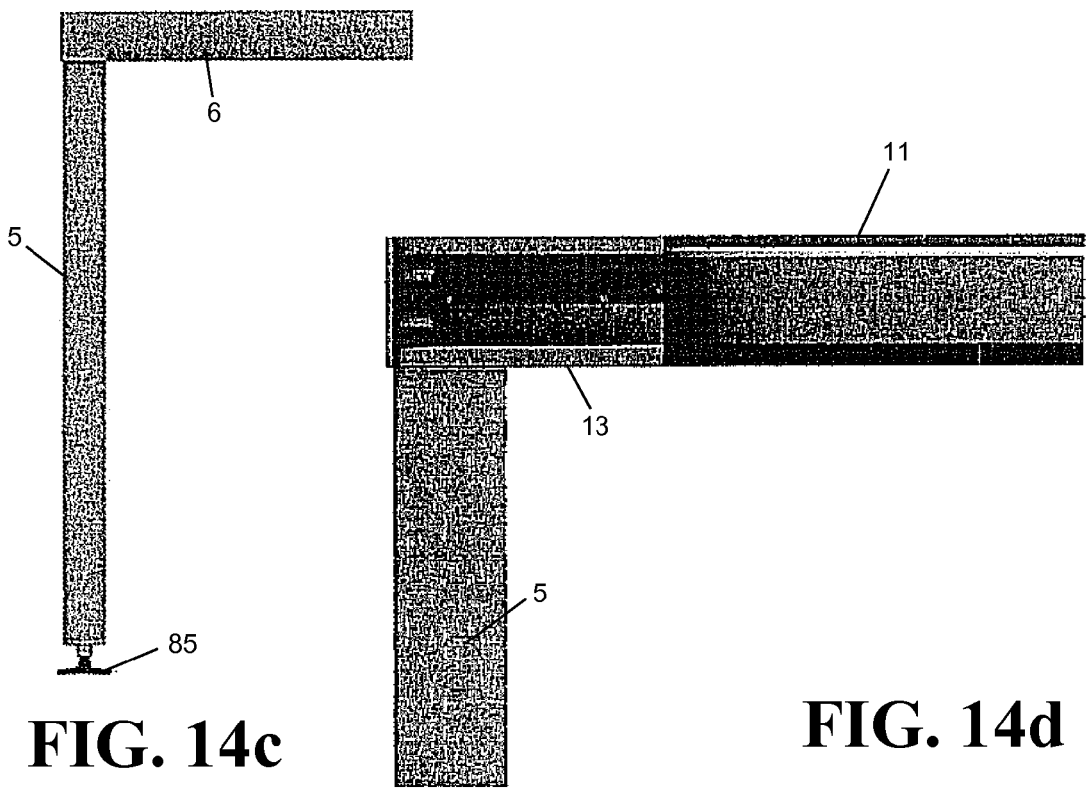
FIG. 14c
FIG. 14d

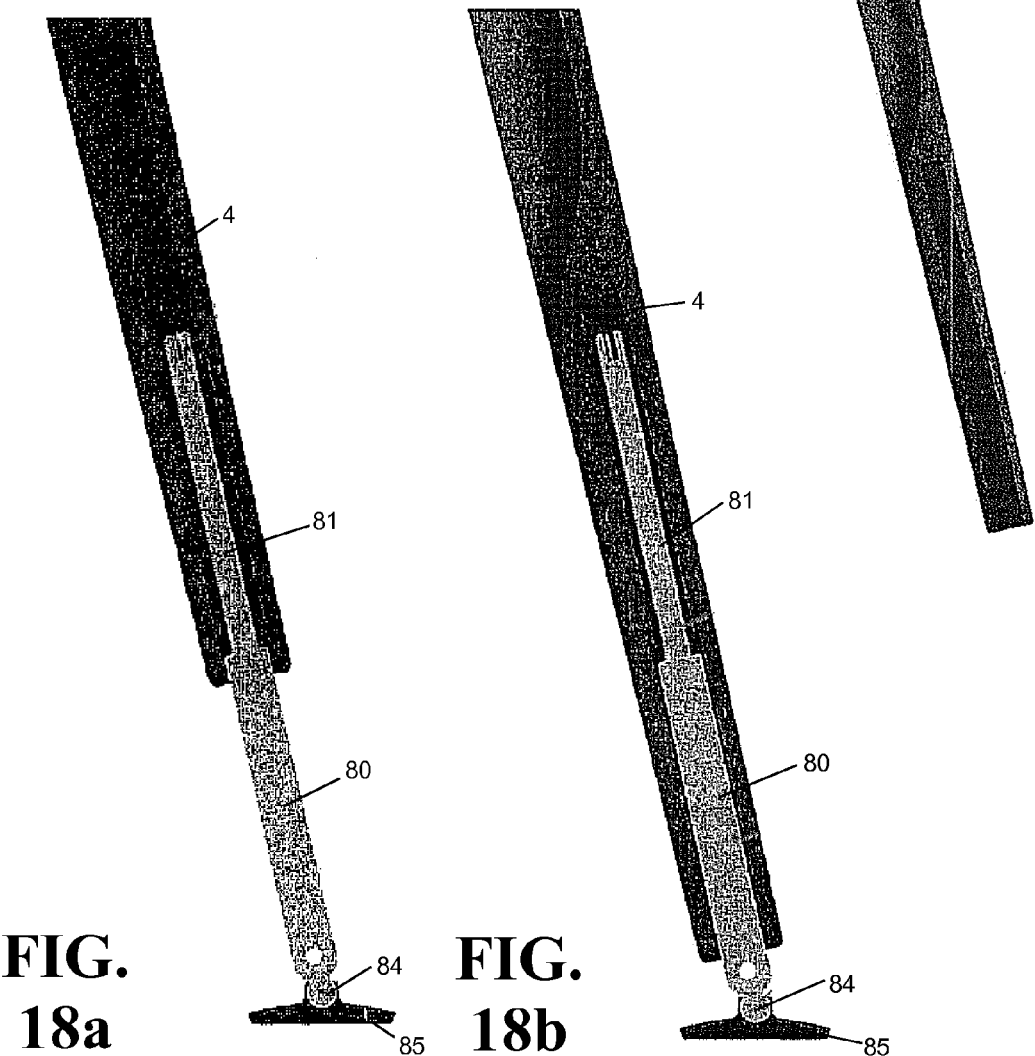

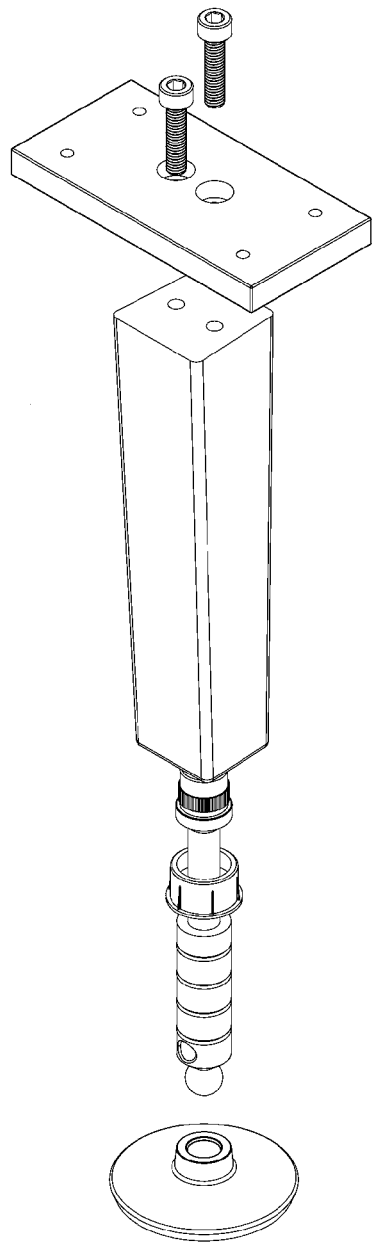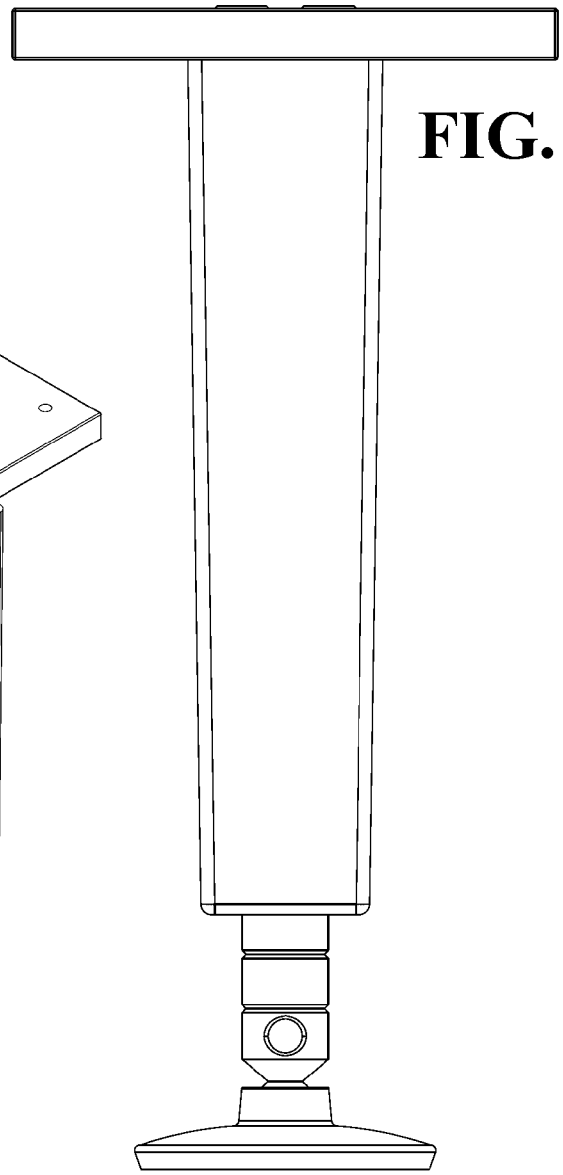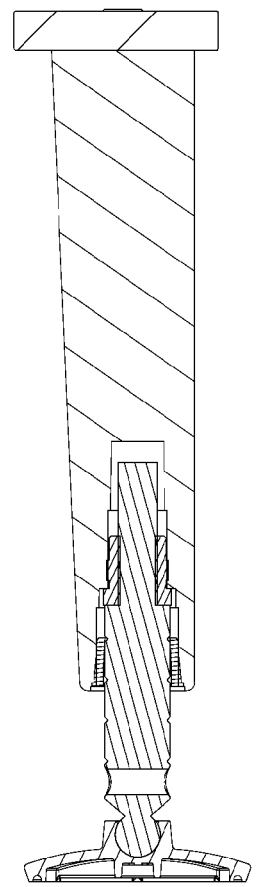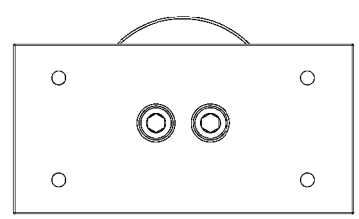
FIG. 34
FIG. 35
FIG. 36
FIG. 37

TABLE SYSTEM

REFERENCE TO CO-PENDING APPLICATION

This application claims priority to German patent application serial No. DE201010037837, entitled "Tischsystem" filed Sep. 29, 2010 by Daniel Korb, the entire contents of which are herein incorporated by reference.

FIELD OF THE INVENTION

The present invention relates generally to tables, and more particularly to a table system with a table top supported by table legs and a table frame having at least one cross strut or longitudinal strut.

BACKGROUND OF THE INVENTION

Tables, such as those disclosed in EP0669092 by Daniel Korb, have been designed with frame members supporting an independent table top surface. In EP0669092 the frame structure was designed to be configurable into a plurality of combinations so that frame components could be used in multiple scenarios. While the frame in EP0669092 is a multifaceted table structure with high stability, it requires the table frame cross-bridges to be quite substantial and much of the material is lavishly designed, so the overall table design has a correspondingly complex and heavy construction.

DE19725045 by Daniel Korb shows another table with frame members and a cross-bridge. The frame members have substantially round cross-sections and provide support for the cross bridges. The cross-bridges are equipped with end-claw-like terminal elements for attachment to the frame members. The particular cross-bridges and frame members are designed for a specific table design that results in the table being relatively expensive to mass produce.

SUMMARY OF THE INVENTION

The present invention provides a table system that allows for multiple table frame arrangements using various combinations of fundamental building pieces. Adjustable height table legs include two parallel and horizontal slots adapted to receive and clamp two independent frame members. The frame members may be bent or angled in a plurality of configurations to achieve a desired shape for the table frame. Sections of the frame members may also include apertures through which fasteners may be threaded to connect two frame members at right angles.

BRIEF DESCRIPTION OF THE DRAWINGS

FIG. 4 shows a cross section of a frame member.

FIG. 5 shows a partial cross section of a clamping mechanism.

FIG. 6 shows a cross section of a frame spacer.

FIG. 7a shows a cross section of a clamping mechanism and two frame members.

FIG. 7b shows a partially exploded cross sectional view of a clamping mechanism secured to two frame members.

FIG. 7c shows a cross sectional view of a clamping mechanism and two frame members.

FIG. 8a shows a cross sectional view of a frame member, a clamping mechanism, and a frame spacer.

FIG. 8B shows a cross sectional view of two frame members and two clamping mechanisms separated by a frame spacer.

FIG. 11a is a top view of a clamping member, with two parallel slots, secured to two bent frame members that extend away from the clamping mechanism and each other.

FIG. 11b is a top perspective view of a clamping member, with two parallel slots, secured to both a linear horizontal frame member and a bent horizontal frame member, wherein the bent frame member is parallel to the linear frame member at the clamping mechanism and the bent frame member is perpendicular to the linear frame member distant from the clamping mechanism.

FIG. 11c is a top perspective view of a clamping member, with two parallel slots, secured to both a linear horizontal frame member and a bent horizontal frame member.

FIG. 12a is a cross sectional view of two frame members secured together in a perpendicular configuration with two fasteners.

FIG. 12b is a top view of two parallel frame members and a third frame member secured perpendicular to one of the parallel frame members.

FIG. 13a is a side view of two table legs, wherein each table leg has a clamping mechanism secured to a first and second horizontal frame member.

FIG. 13b is a front view of the assembly of FIG. 13a.

FIG. 14a side cut out view of a table leg secured to a frame member through a clamping mechanism.

FIG. 14b is a perspective view of the assembly of FIG. 14a.

FIG. 14c is a side view of the assembly of FIG. 14a.

FIG. 14d is a partial cutout view of the assembly of FIG. 14a.

FIG. 18a illustrates a slanted table leg with a height adjustment mechanism fully extended.

FIG. 18b illustrates a slanted table leg with a height adjustment mechanism fully retracted.

FIG. 18c illustrates a slanted table leg without a height adjustment mechanism.

FIG. 34 is an exploded perspective view of a straight leg shown in FIG. 23.

FIG. 35 is a side view of the intermediate support leg of FIG. 34.

FIG. 36 is a cross sectional view of the intermediate support leg of FIG. 34.

FIG. 37 is a top view of the intermediate support leg of FIG. 34.

DETAILED DESCRIPTION

The present invention may be used with any type of top surface and is particularly suited for tables and applications requiring a lightweight, rigid, and robust frame that may be used in multiple configurations. The improved modular frame may be used with various objects such as chairs, stools, benches, and tables. However, for descriptive purposes, the present invention will be described in use with a table.

Figure 1:
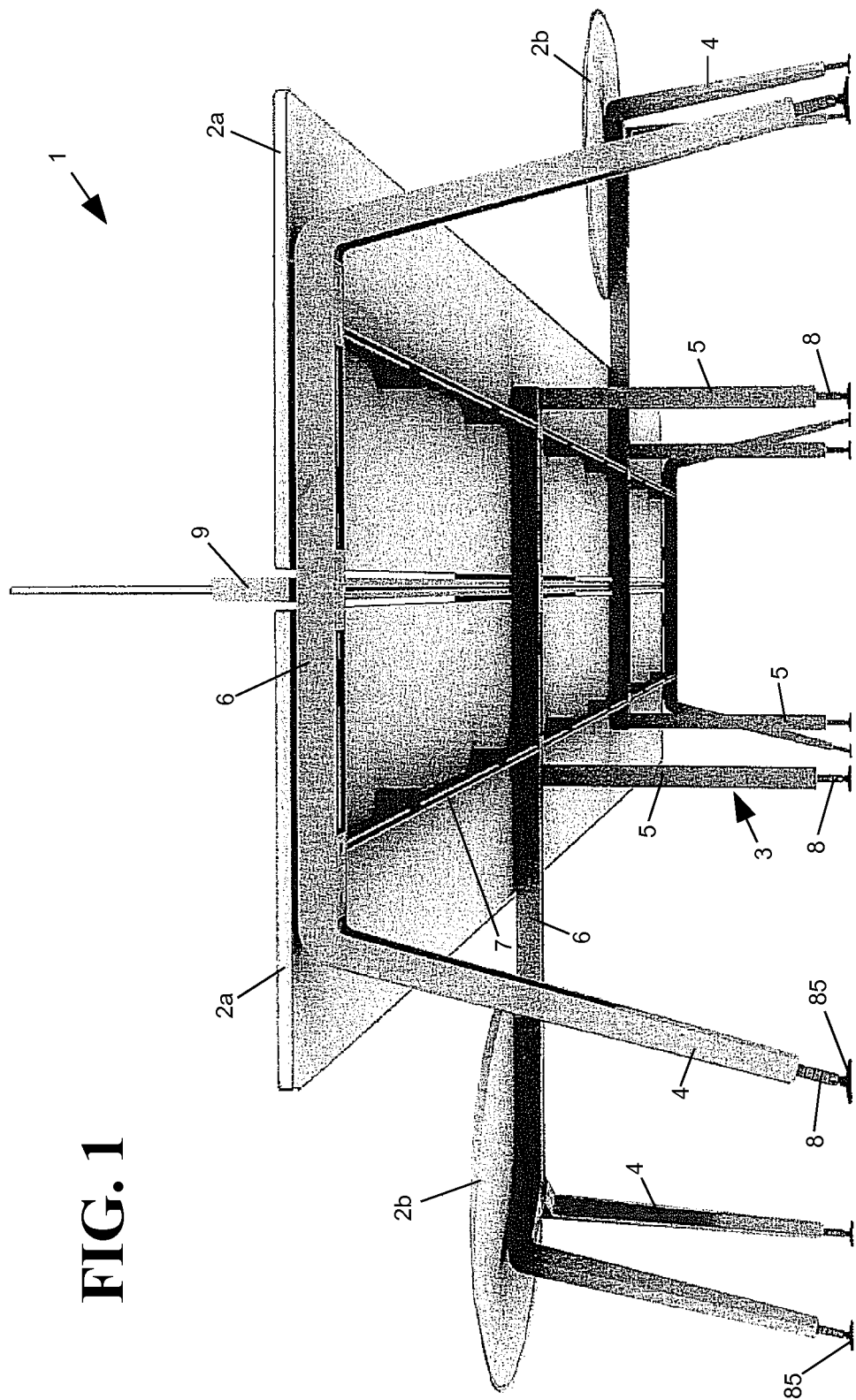
FIG. 1 shows a table system with a frame and several table tops in a lower perspective side.

FIG. 1 shows a table system 1 with a table frame 3 on which two rectangular table tops 2a, and two round table tops 2b are attached using fasteners on the top of the table frame 3. The table frame is constructed of a frame with a first cross brace 6 and a second cross brace 7 as well as longitudinal struts to the frame-mounted inclined legs 4 and four vertical legs 5. In the central longitudinal axis on the table frame 3, a vertical construction 9 with two vertical panels and a vertical plate is attached to the top side by retaining elements such as those shown in FIGS. 2 and 3. The vertical legs 5 and the inclined legs 4 are equipped with height adjustment units 8 in their lower sections to adjust the height of the table legs. The table legs also include a foot plate 85 at the bottom edge of the height adjustment units to prevent damage to the floor surface below the table. In the upper portion of the inclined legs 4, there are integral clamping mechanisms that interlock with the cross braces. The vertical legs 5 are releasably secured to separate clamping mechanisms that connect to the horizontal cross braces. The second cross braces 7 extend along the length of the table while first cross braces 6 extend along the width of the table and are secured to the clamping mechanisms and the second cross braces.

Figure 2:
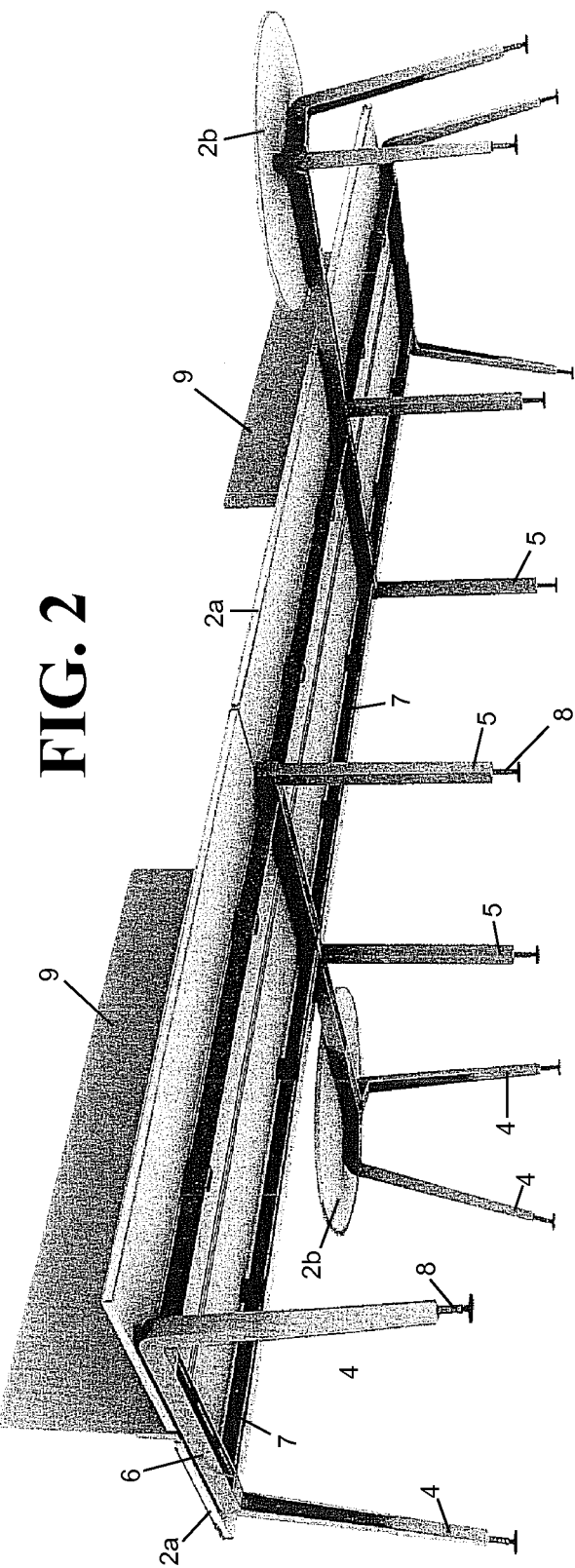
FIG. 2 shows the system of FIG. 1 in another lower perspective view from the side.
Figure 3:
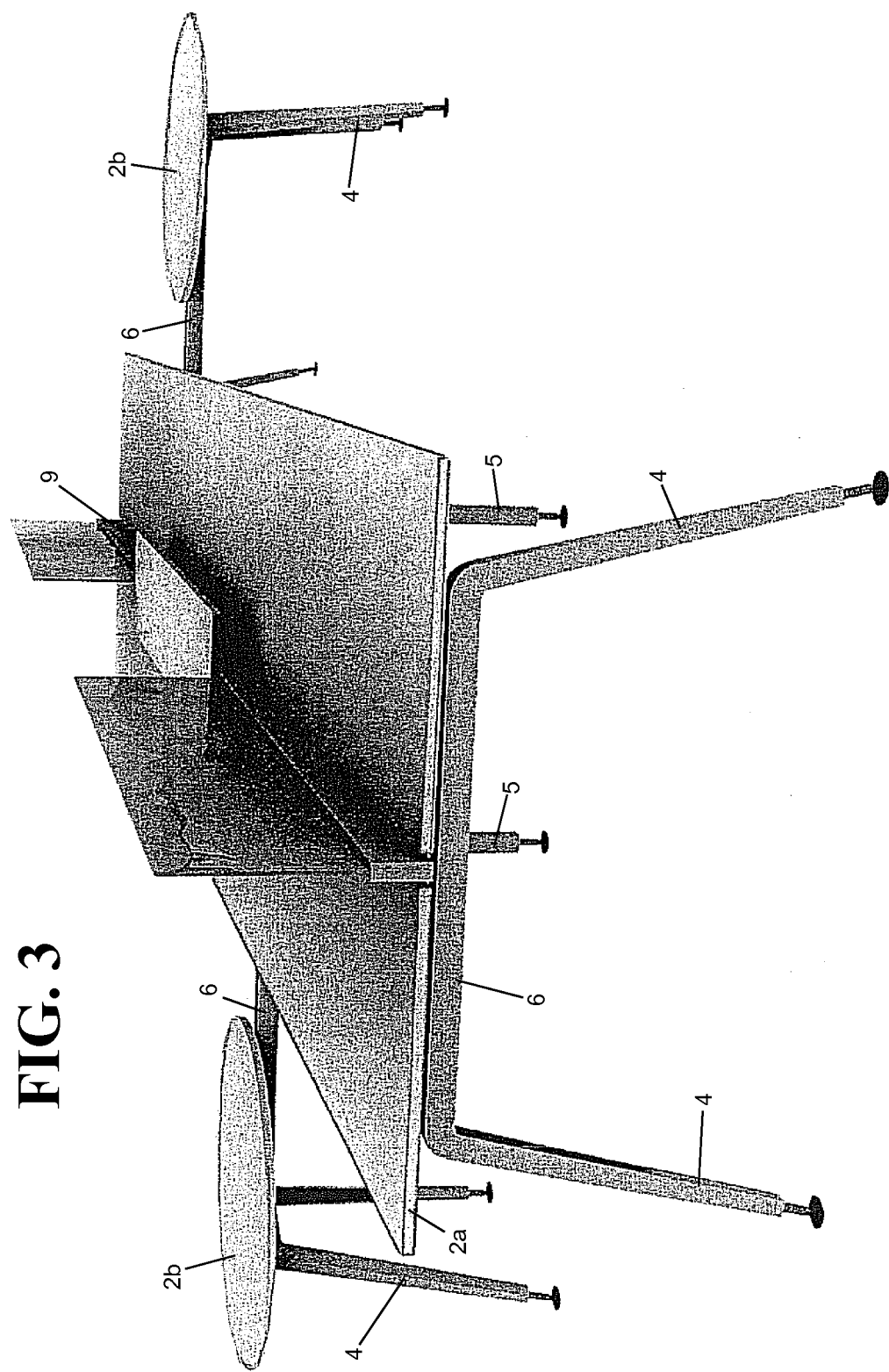
FIG. 3 shows the system of FIG. 1 in an upper perspective view.

A notable feature of the table system shown in FIGS. 1-3 is that the cross bars are constructed from an assembly 10 of two frame sections 11 or structural bands that are held together by a clamping mechanism having two clamp sections 13 as shown in the cross-sectional views in FIGS. 4, 5, 7a-7c. FIG. 6 shows a frame spacer 12 section that is highlighted in FIGS. 8a and 8b. As an example, in FIG. 8b the frame spacer 12 may be used to join two adjacent inclined legs.

As shown in FIG. 4, the frame sections 11 (structural bands) have a flat profile with a first flat side 112 that is parallel to and slightly shorter than a second flat side 114 with terminal portions 110 that are formed in the transition between the first and second flat sides (112, 114). The In the body of the frame sections 112 there are longitudinal channels 116 in which fasteners may be secured. Alternatively, the longitudinal channels in the frame sections may be used solely to reduce the weight of the frame sections. In the illustrated example, the frame sections 11 are symmetrical about a plane extending perpendicular to the first and second flat sides (112, 114). The terminal portions 110 of the frame sections 11 include asymmetrical V-shaped grooves 117 that are less steep and shorter towards the first flat side 112 and longer and steeper towards the second flat side 114. The longitudinal groove 117 and the first flat side 112 results in a projection 118 that is shorter than a longitudinal groove 117 between the second flat side 114. The steeper slope includes a transition area 115 that extends further away from the plane of symmetry than the projection 118. The projection 118 includes a bevel 111 towards the first flat side 112 such that the projection has a substantially conical cross section. The thickness of the frame section 11 between the first and second flat sides (112, 114) is typically between one third and one sixth of the length of the longer second flat side 114, however other thicknesses are within the scope of the present invention. With this aspect ratio of height to width, the frame sections are relatively easy to bend in the horizontal plane, however they provide a high degree of rigidity and mechanical stability in the vertical direction.

Shown in FIG. 5 is a cross-section of a clamp section 13 having a substantially T-shaped cross section. The end portions 130 of the clamp section have a protrusion 135 and a valley 136 that are configured to interlock with the projections 118 and grooves of the frame sections 11. The narrow end sides 133 of the end portions have a shape that is substantially defined by the transition area 115 of the frame sections 11.

The clamp section 13 has a flat longer side 134 that is parallel to a flat upper shorter side 132 and perpendicular to the flat side surfaces 131. Within the clamp section 13 is a longitudinal channel 137 that may include threading for securing fasteners through to the clamp section 13. The longitudinal channel may also be used to reduce the weight and about of material used in the construction of the clamp section 13.

FIGS. 7a, 7b, and 7c show two parallel frame sections 11 and two clamp sections 13 cooperating to form a clamping mechanism. Both the upper and lower clamping sections have T-shaped cross sections. Between the first flat sides of the frame sections is a gap 14. The protrusions 135 of the clamp sections interlock with the grooves 117 of the frame sections while the projections of the frame 118 interlock with the valleys of the clamp sections. Additionally, the shorter first sides of the frame sections are adapted to be pressed against the flat side surfaces of the clamp sections. Apertures through the flat longer side 134 and flat shorter side 134 may also be provided through which fasteners may secure two clamping sections together to form a clamping mechanism. The clamping sections 13 are sized so that when the clamping mechanism has locked in a frame section, the flat shorter sides 132 of the clamping sections are in close proximity, but not touching. As shown in FIG. 7c, two clamping sections 13 and two frame sections 11 combine can combine into a base unit 10 that has a substantially rectangular cross section. The upper clamping section has a top side 202 that is at the same elevation as the zeniths 203 of the flat sides of the frame sections. Due to the tight fit of the narrow sides 133 of the clamping sections against the transition areas 115 of the frame sections, the base unit 10 may have the appearance of a single continuous unit. The upper and lower clamping sections of the base unit may have a substantially equal length, however it is within the scope of the present invention to use clamping sections of unequal size. Using multiple lower clamping sections with a single upper clamping section is contemplated by the inventor.

Shown in FIG. 6 is a frame spacer 12 that has twice the thickness of a frame section and a cross section with an outer contour that is similar to the inner contours of frame sections in a base unit. The frame spacer is configured to be secured to two separated clamping mechanisms. The frame spacer has parallel flat sides 122, grooves 123, and projections 125 similar to the frame sections. The frame spacer also has a longitudinal cavity 124 that may be adapted to receive fasteners, or may be structured to reduce the weight of the frame spacer while maintaining the structural rigidity of the frame spacer.

As shown in FIGS. 8a and 8b, the base units 10 of the table system may be constructed from a various combinations of frame spacers 12, clamping sections 13, and frame sections 11. The use of multiple clamping sections secured to multiple table legs may be used when it is desired to link two or more tables together. Alternatively, two adjacent table legs with two adjacent clamping sections may be used for a single table top that is expected to carry a substantial load.

Figures 9A, 9B:
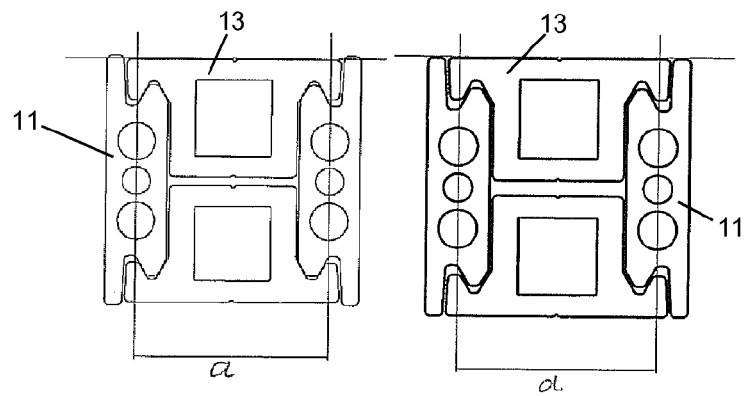
FIG. 9a illustrates a cross sectional view of an uncoated clamping mechanism and frame members.
FIG. 9b illustrates a cross sectional view of a powder coated clamping mechanism and powder coated frame members.
Figure 10A:
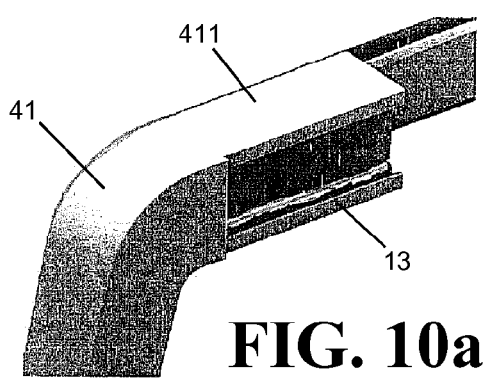
FIG. 10a is a perspective view of a table leg with a clamping mechanism secured to a single frame member.
Figure 10B:
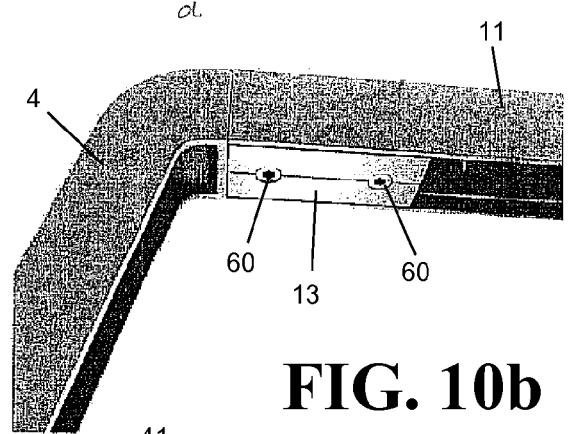
FIG. 10b is a bottom perspective view of a table leg with a clamping mechanism secured to two frame members.
Figure 10C:
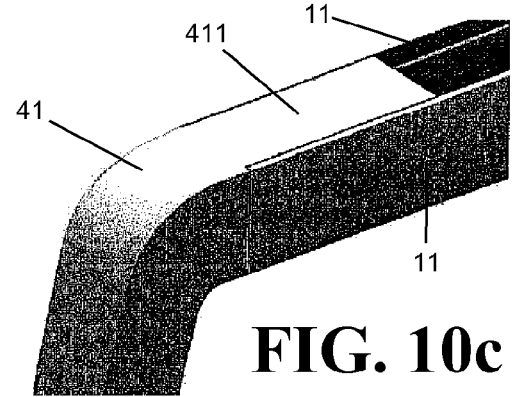
FIG. 10c is a side perspective view of a table leg with a clamping mechanism secured to two frame members.
Figure 10D:
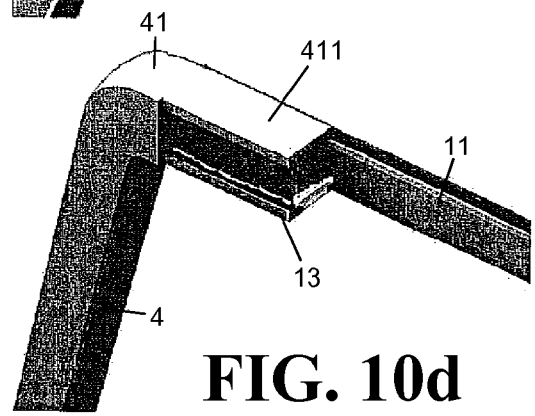
FIG. 10d is a top perspective view of a table leg with a clamping mechanism secured to a single frame member.
Figure 10E:
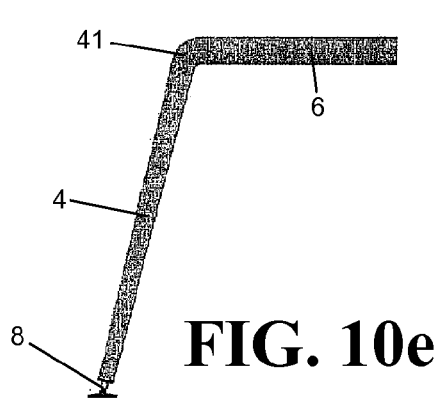
FIG. 10e is a side view of a table leg secured to a horizontal frame member.
Figure 10F:
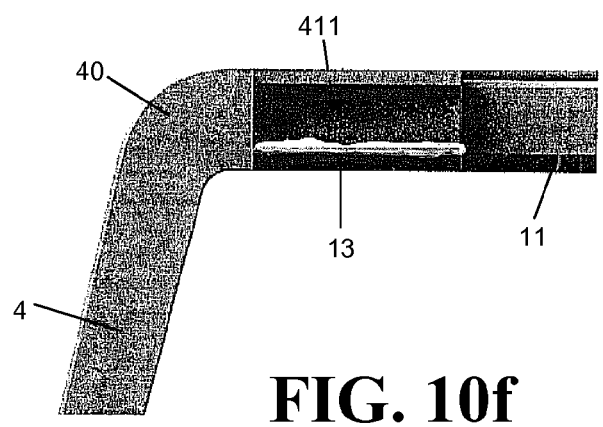
FIG. 10f is a side view of a table leg with a clamping mechanism secured to a single frame member.

In FIGS. 9a and 9b are shown two base units. In FIG. 9a, the frame sections 11 and clamping sections 13 are uncoated, while in FIG. 9b the frame sections and clamping sections have been powder-coated. The additional thickness provided by the power-coating results in the upper and lower surfaces of the base unit being substantially flat. In the uncoated base unit, the clamping sections are slightly depressed into the base unit, however the unevenness of the unit is only detectable under close inspection. The clamping mechanism and two parallelly extending frame sections cooperate to have a rectangular cross-section. As shown in FIGS. 9a and 9b, each clamping section has a protrusion located within one of the grooves of the first frame section and one of the grooves of the second frame section.

FIGS. 10a through 10f show various views of slanted table legs 4 that have a bent upper area 41 that extends to an integrally formed clamping section 411. The bottom of the base unit is a clamping section 13 that is comprised of a separate clamping plate through which screws 60 may be used to secure the clamping plate to the integrally forced clamping section. Since the clamping plate is flush with the frame sections or depressed into the base unit, the clamping plate is not readily visible from above the frame structure. In the illustrated example the clamping plate is located below the integrally formed clamping section of the table leg, however the inventor contemplates other embodiments of the invention wherein the clamping plate is located above the integrally formed clamping section that is part of a table leg.

FIGS. 11a, 11b, and 11c illustrate an example of a base unit secured to a vertical table leg. The lower clamping section 13 of the base unit may be integrally formed as part of the table leg, or alternatively, the table leg may be separable from all parts of the base unit. In the illustrated example, the upper clamping section 13 is comprised of a clamping plate having apertures through which screws may be passed to secure the upper clamping section to the lower clamping section. FIG. 11a illustrates a first frame section 200 that extends parallel to a second frame section 201 wherein the frame sections are clamped together.

If the lower clamping section is separable from the table leg, bolts and other fasteners may be used to secure the lower clamping section to the vertical table leg as shown in FIGS. 14a and 14b. By having four separate frame sections secured to a base unit with a single vertical leg, multiple frame sections may be used as a single supported cross bar that has a length greater than the length of the individual frame sections. As showing in FIGS. 11a through 11c, while the frame sections are parallel to each other in the base unit, they may bend away from each other at various angles such as 90 degrees shown in FIGS. 11b and 11c, or 180 degrees as shown in FIG. 11a.

Figure 12C:
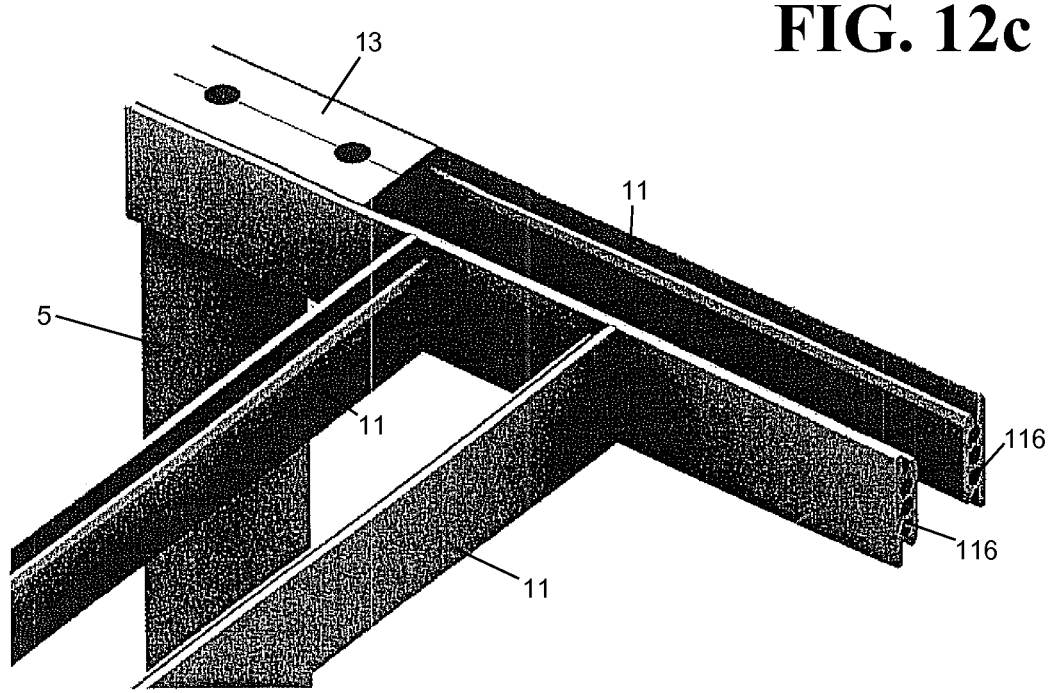
FIG. 12c is a front top view of two parallel frame members secured to a clamping mechanism, wherein third and fourth frame members are secured perpendicular to one of the parallel frame members.
Figure 12D:
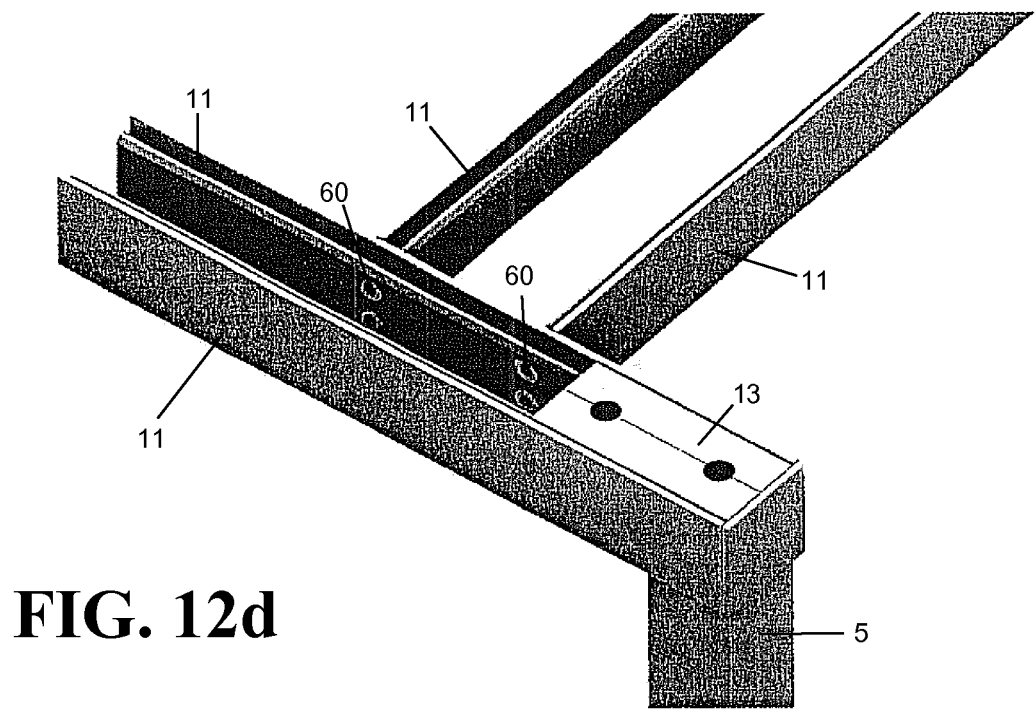
FIG. 12d is a rear top view of two parallel frame members secured to a clamping mechanism, wherein third and fourth frame members are secured perpendicular to one of the parallel frame members.

FIGS. 12a through 12d show frame sections 11 perpendicularly connected to other frame sections 11 to form cross braces. FIG. 12a illustrates a cross section of two intersecting frame sections that have held together with screws 60. One of the frame sections includes longitudinal channels 116 that have been threaded so that the screws may be securely fastened into the channels. As shown in FIGS. 12b, 12c, and 12d the inner frame section of the cross brace includes apertures through which the screws are threaded. By hiding the screws with an outer frame section, the frame structure presents a more refined appearance. In FIG. 12b a third frame section is perpendicularly secured to the first frame section by a fastener.

Figures 13A, 13B:
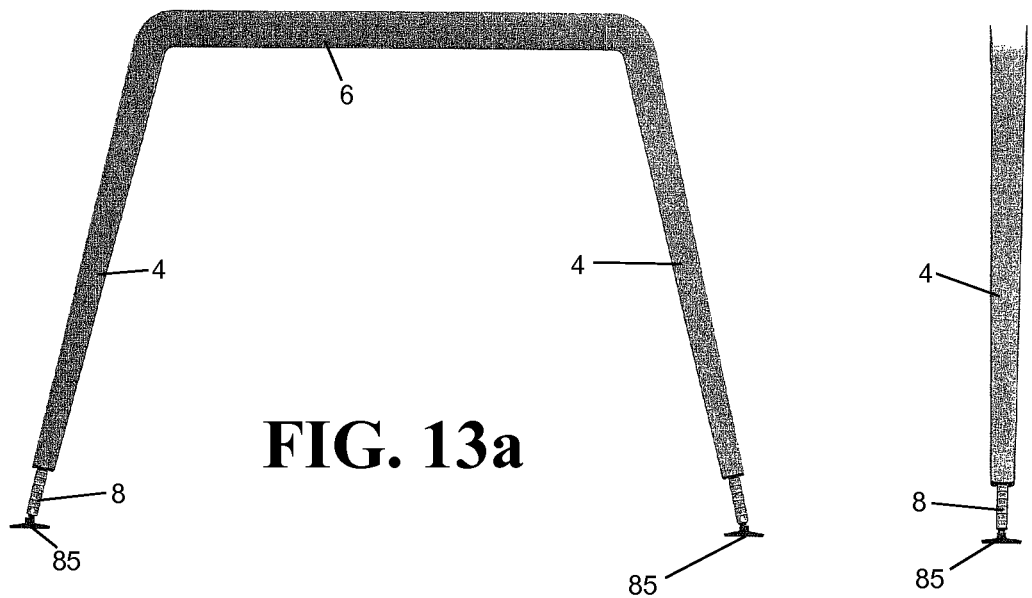

FIGS. 13a and 13b show slanted legs 4 that are equipped with height adjustment units 8. FIG. 13a shows the connections between two slanted legs with a cross brace 6. FIG. 13b is a front view of the assembly of FIG. 13a.

Figure 15:
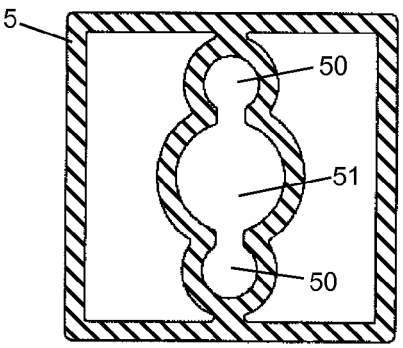
FIG. 15 shows two vertical leg cross sections.
Figure 16:
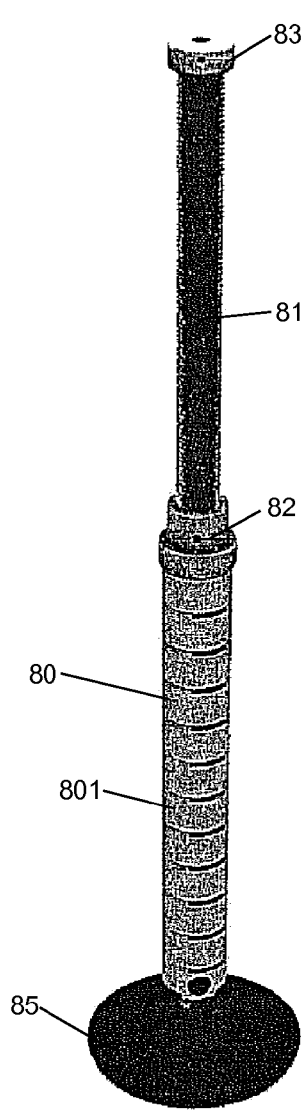
FIG. 16 illustrates a height adjustment mechanism for a table leg.

FIGS. 14a through 14d show various representations of a vertical leg 5 secured to a frame section 11 through a base unit. In the illustrated example, the vertical leg includes a receiving channel 50 for receiving the height adjustment unit. The vertical leg also includes screw channels 51 for receiving screws 60 from the base unit. FIG. 15 shows a cross section of the vertical leg 5, with the receiving channel 50 and the screw channels 51. FIG. 16 shows an isolated view of the height adjustment mechanism. The height adjustment mechanism includes a sliding guide 83 adapted to slide through the receiving channel of the vertical leg. The adjustment mechanism includes a threaded arm 81 configured to pass through a lower section 80. A stopper 82 near the top of the lower portion 80 is configured to interconnect with the vertical or slanted legs. The stopper 82 is firmly pressed against the receiving channel and acts to transmit the weight of the table to the floor. The height adjustment mechanism passes through a lower opening 86 of the table leg and a ball joint 84 is used to position the floor plate 85 at an orientation to match the floor surface.

Figure 17A:
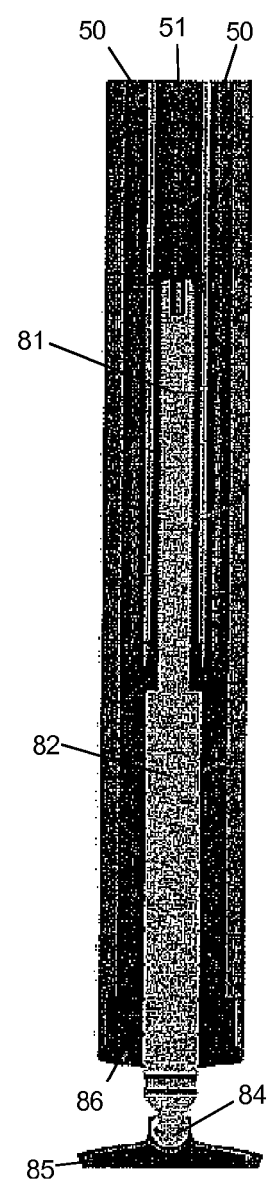
FIG. 17a shows a cutout view of a height adjustment mechanism within a table leg.
Figure 17B:
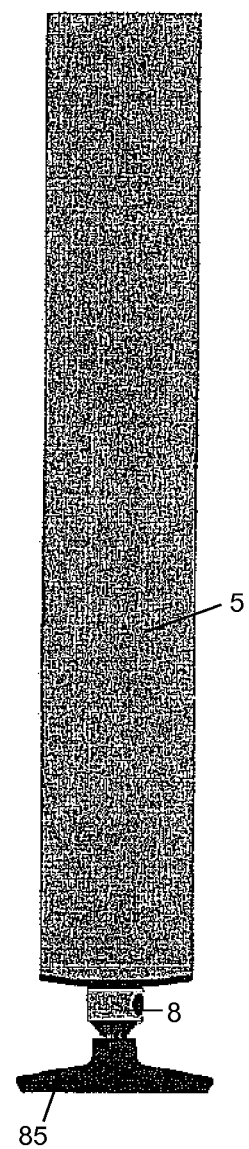
FIG. 17b illustrates a table leg enclosing a height adjustment mechanism.

FIGS. 18a, 18b, and 18c show a cross section of the slanted table leg 4 with a height adjustment mechanism 8 which is similar to the mechanism shown in FIGS. 16 and 17a.

Figure 19:
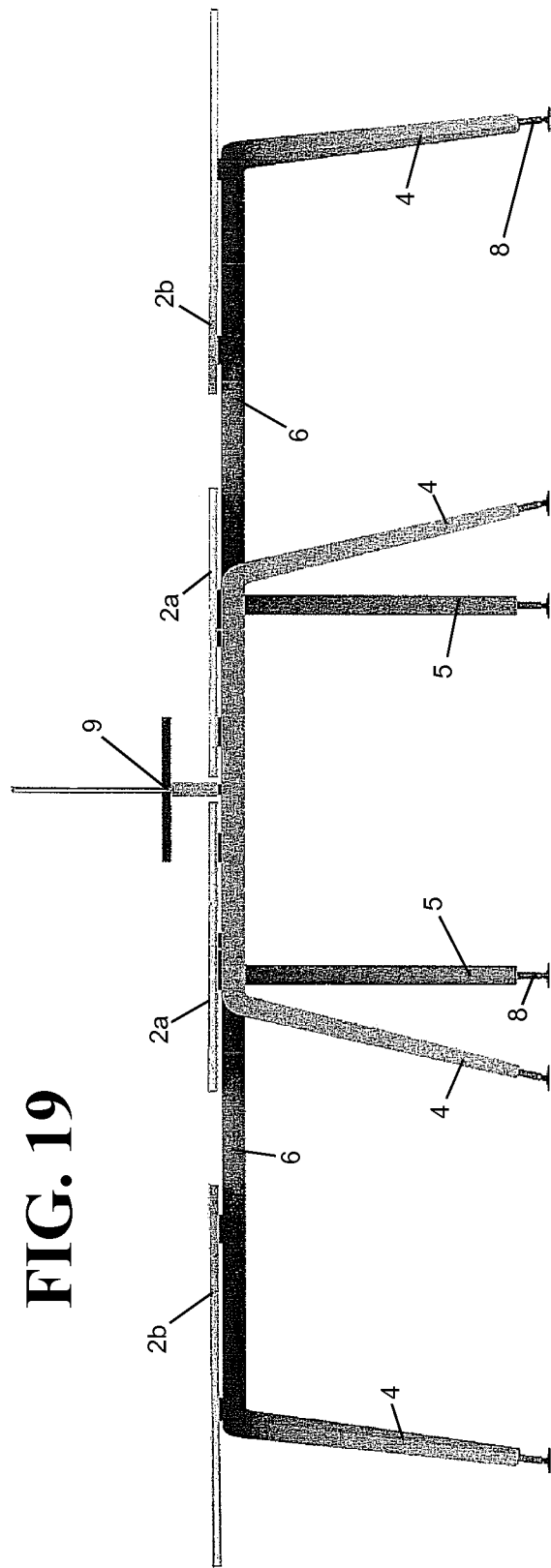
FIG. 19 is a side view of the desk system of FIG. 1.
Figure 20:
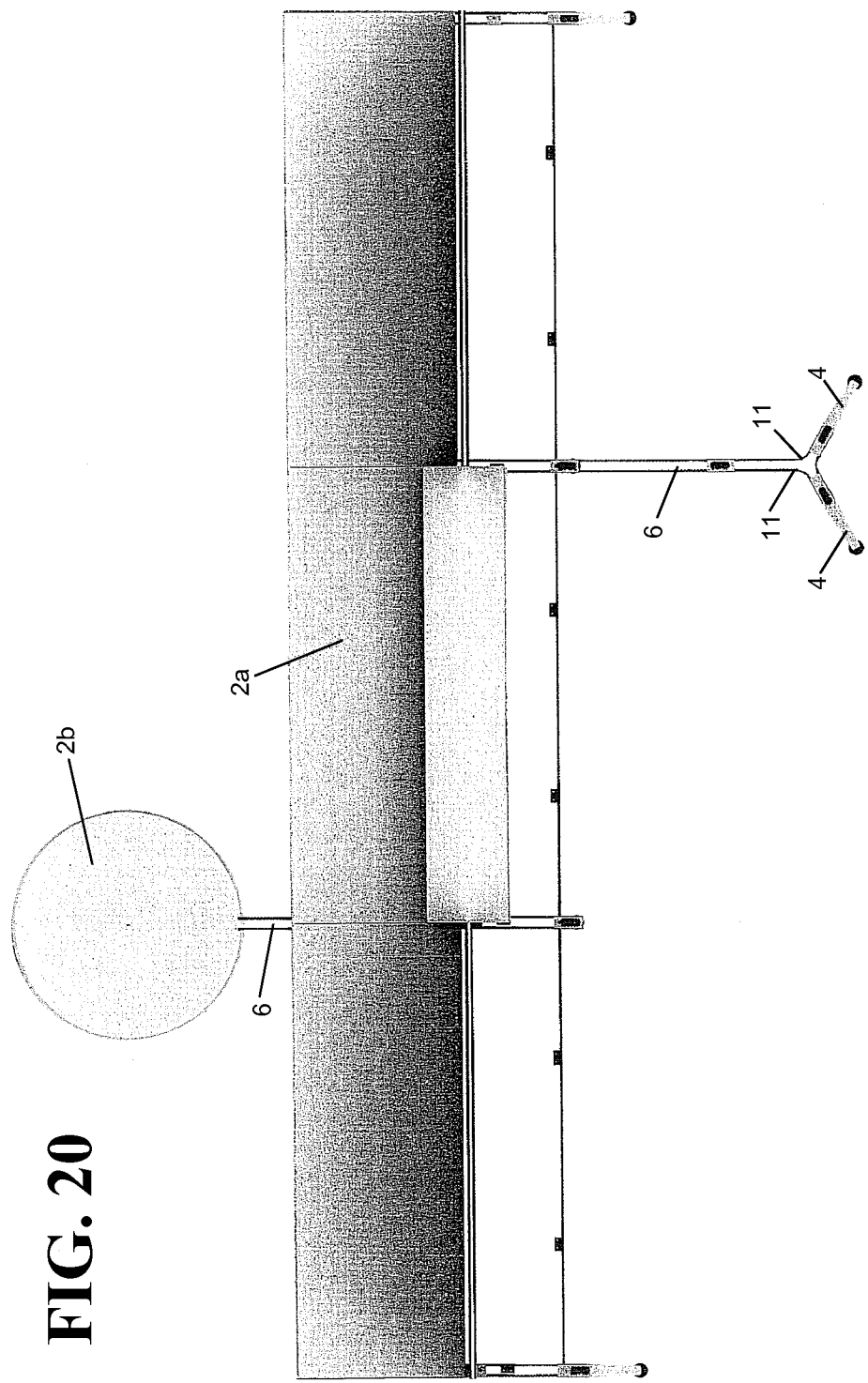
FIG. 20 is a top view of the desk system of FIG. 1.
Figure 21:
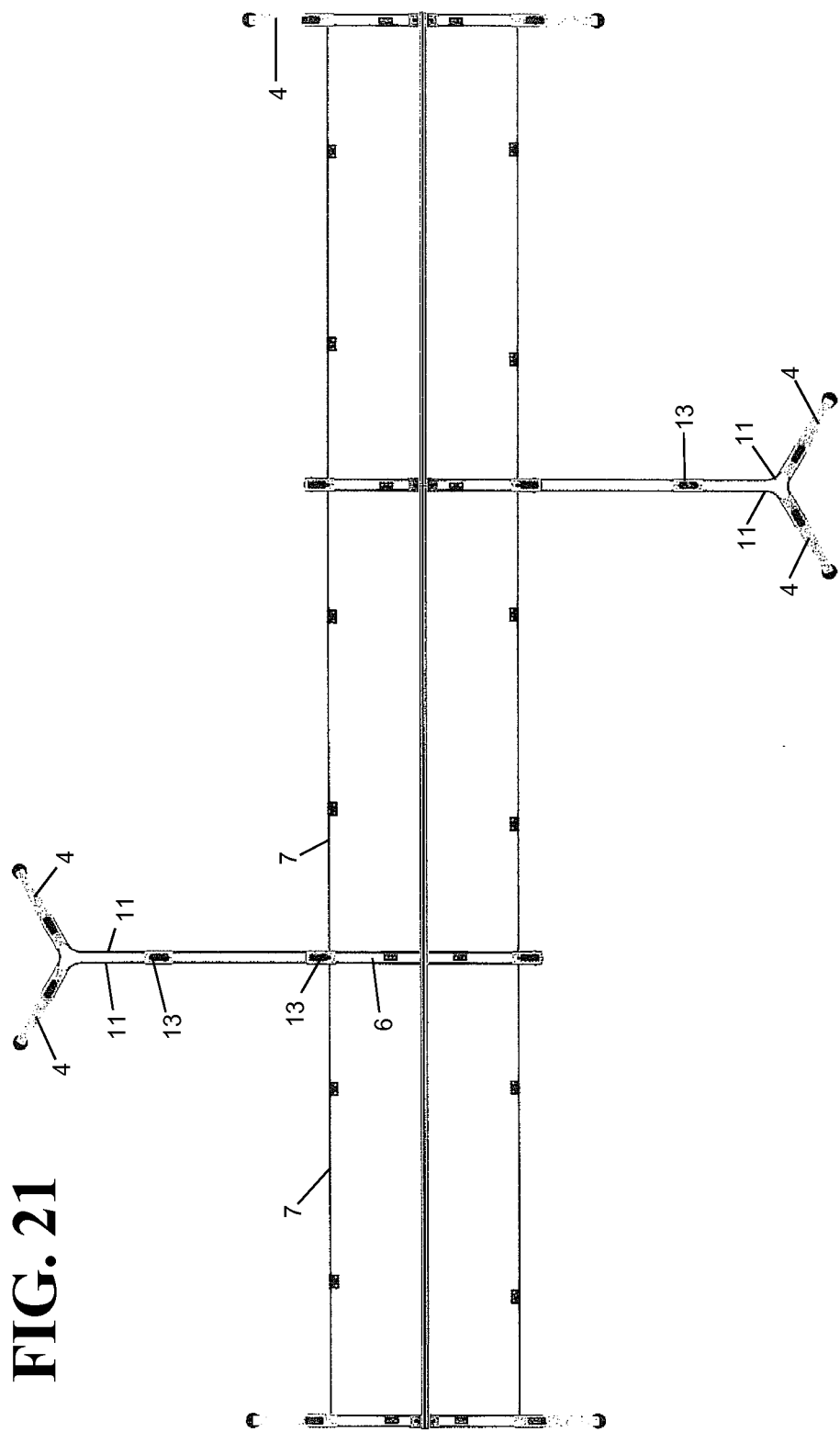
FIG. 21 is a top view of the desk system of FIG. 1 without the table tops.

FIG. 19 show a side view of the desk system 1 of FIG. 1 with longitudinal struts 7 and cross braces 6 in a structured framework connected to slanted legs 4 and vertical legs 5. FIG. 20 shows the table system of FIG. 1 from a top view while FIG. 21 shows the table system of FIG. 1 without the tops. Under the round tops, two slanted legs having integrally formed clamping sections are arranged at a 120° angle to each other. A frame section is bent at 120° to match the alignment of the legs and extend between the base units at the legs. Similarly, the individual frame sections may be bent at a plurality of angles to create various frame profiles such as a branched profile or a honeycomb profile.

Figure 22:
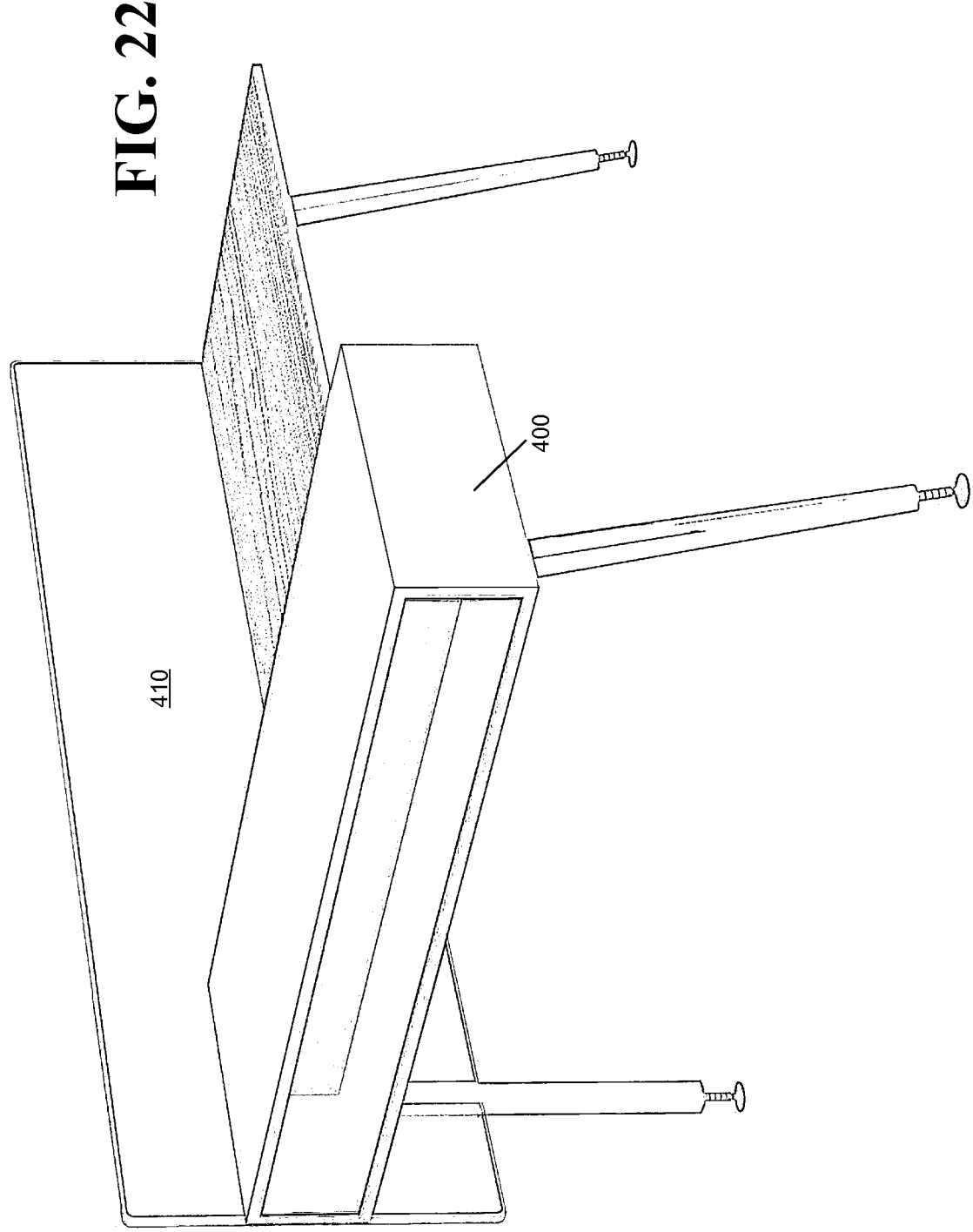
FIG. 22 is an upper perspective view of a table system with an integral storage compartment and a divider.
Figure 23:
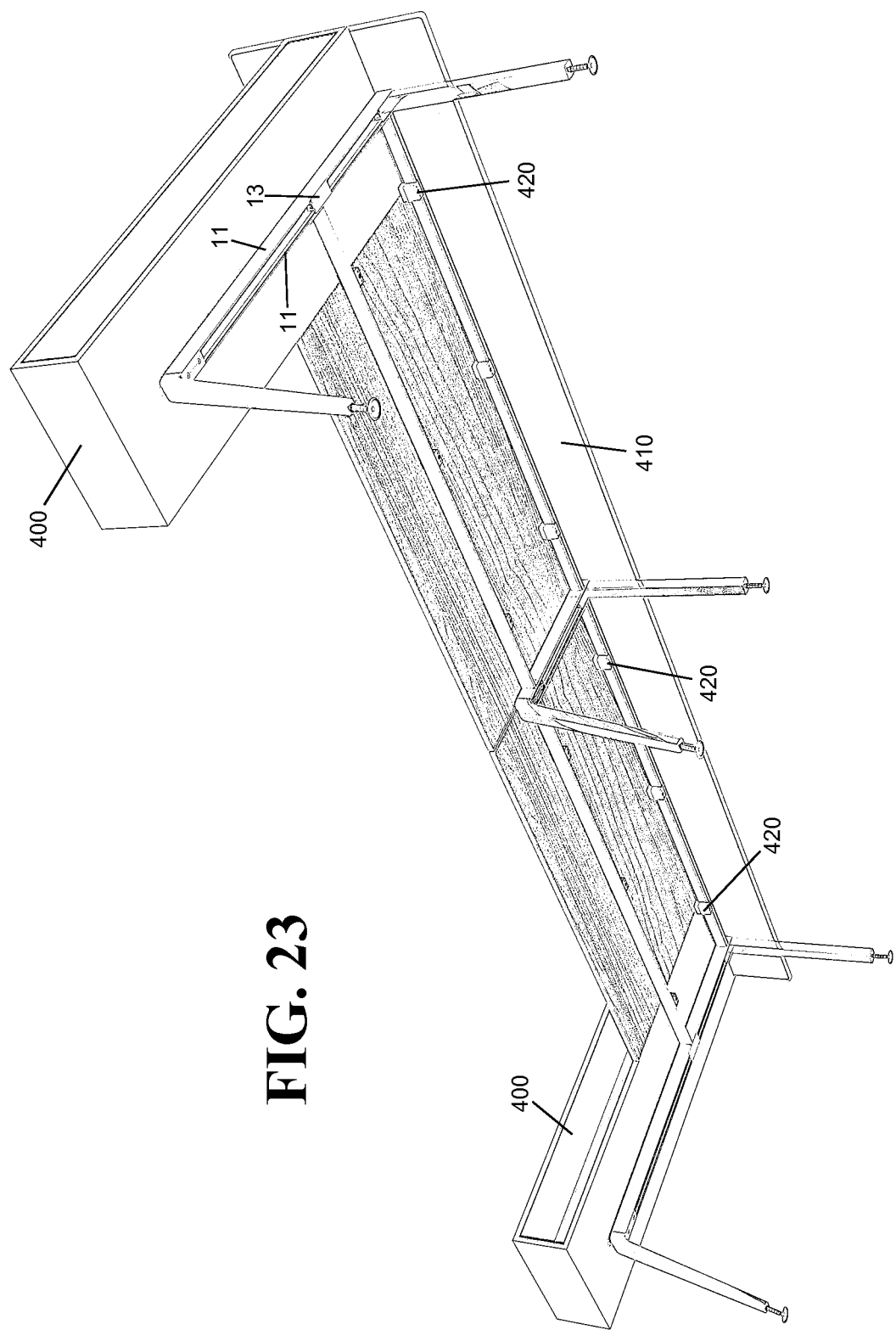
FIG. 23 is a lower perspective view of a table system with two storage compartments, a table top and a divider.

FIGS. 22 and 23 show perspective views of table systems with storage compartments 400 and dividers 410. The inclined table legs may include integrally formed apertures in their bent upper areas and integrally formed clamping sections for securing the storage compartments 400 to the table frame. A single clamping section 13, distant from a table leg, is positioned between two frame sections 11 to provide another point to secure the storage compartment to the table frame. The table top is supported by support structures 420 clamped onto the frame sections.

Figure 24:
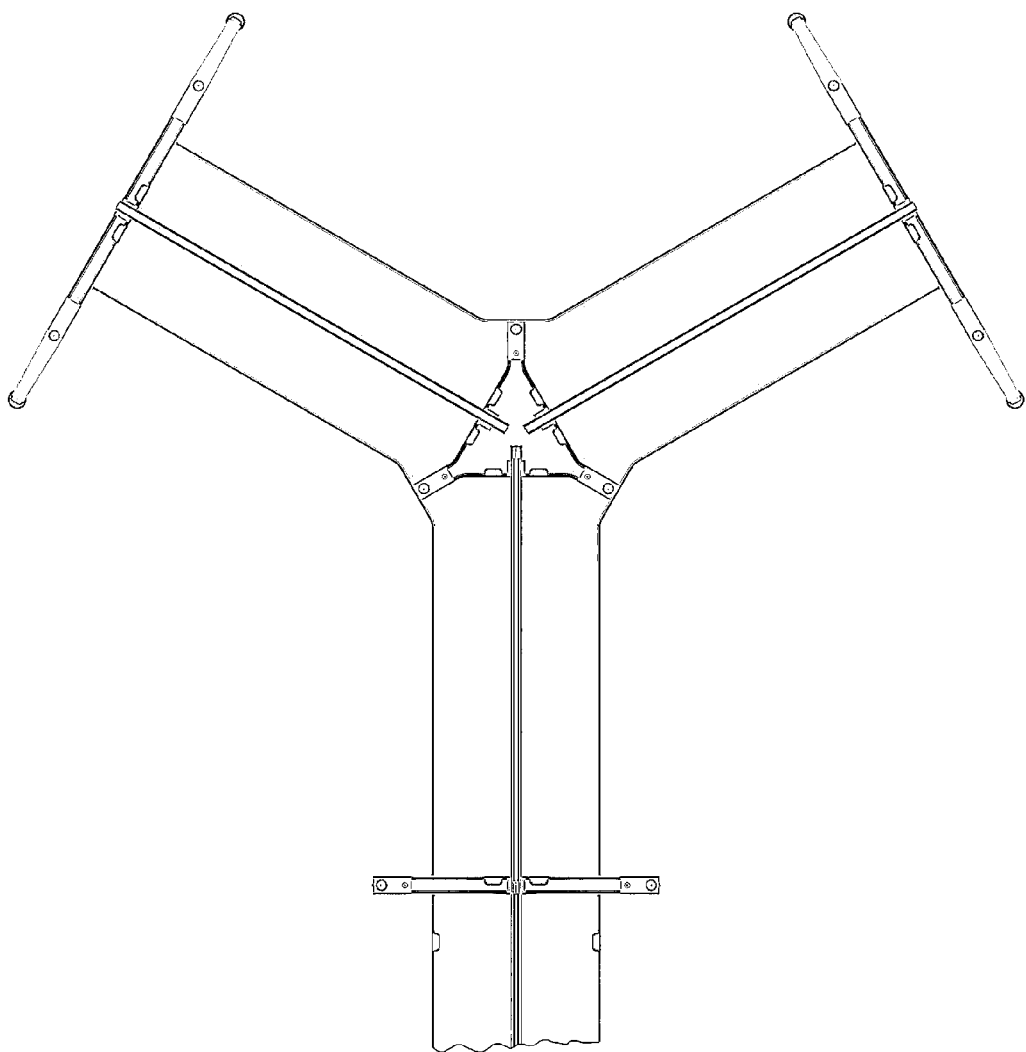
FIG. 24 is a top view of a table system with three sections intersecting at a central location.

FIG. 24 illustrates an example of a table system with multiple table tops connected at a triangular intersection. Having multiple table tops converge at a single location allows a single electrical and communication hub to serve multiple areas without extensive wiring.

Figure 25:
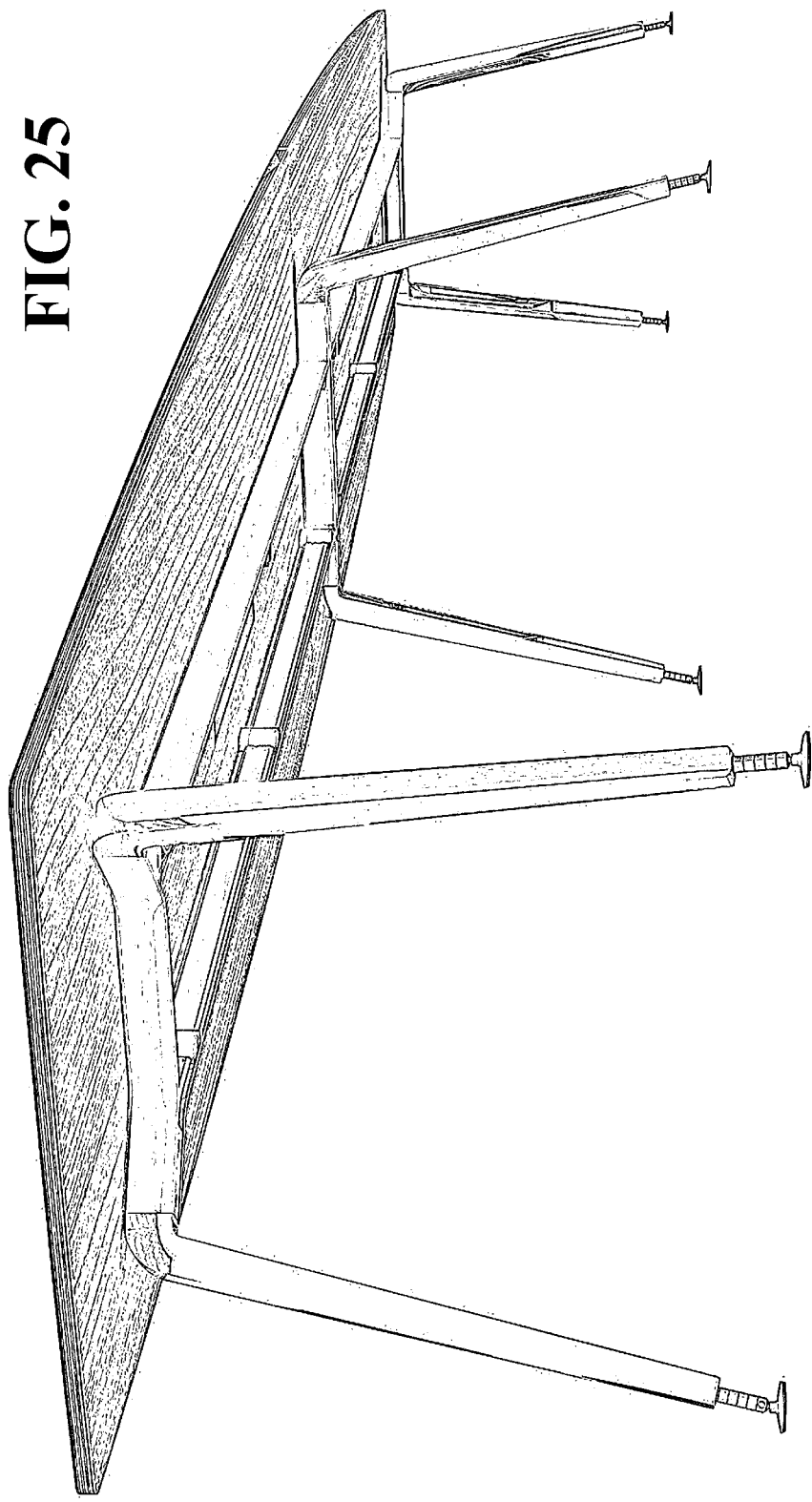
FIG. 25 is a lower perspective view of a table system having spacers attached to cross members for supporting the table top.

FIG. 25 illustrates an example of linear frame sections perpendicularly secured to bent frame sections. Multiple unique configurations and styles may be created by utilizing bent and linear frame sections in a single table frame.

Figure 26:
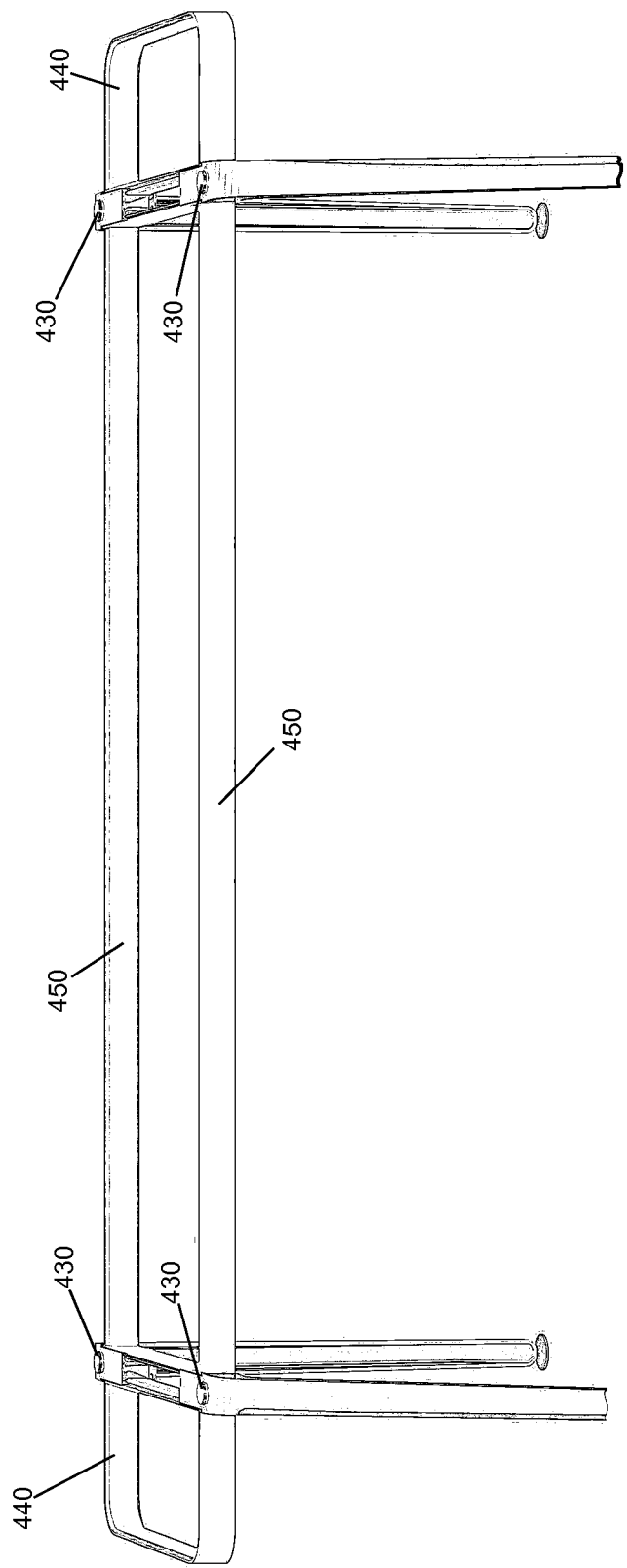
FIG. 26 is a perspective view of a table frame system having U-shaped braces and spacers integrally formed into the table legs for supporting a table top.

FIG. 26 shows a table frame having table legs with integrally formed supports 430 for supporting a table top. U-shaped frame structures 440 are perpendicularly secured to linear frame structures 450 extending between the table legs. The U-shaped frame structures provide for additional locations for a table top to be supported and may increase the maximum length of table that may be supported by only four legs.

Figure 27:
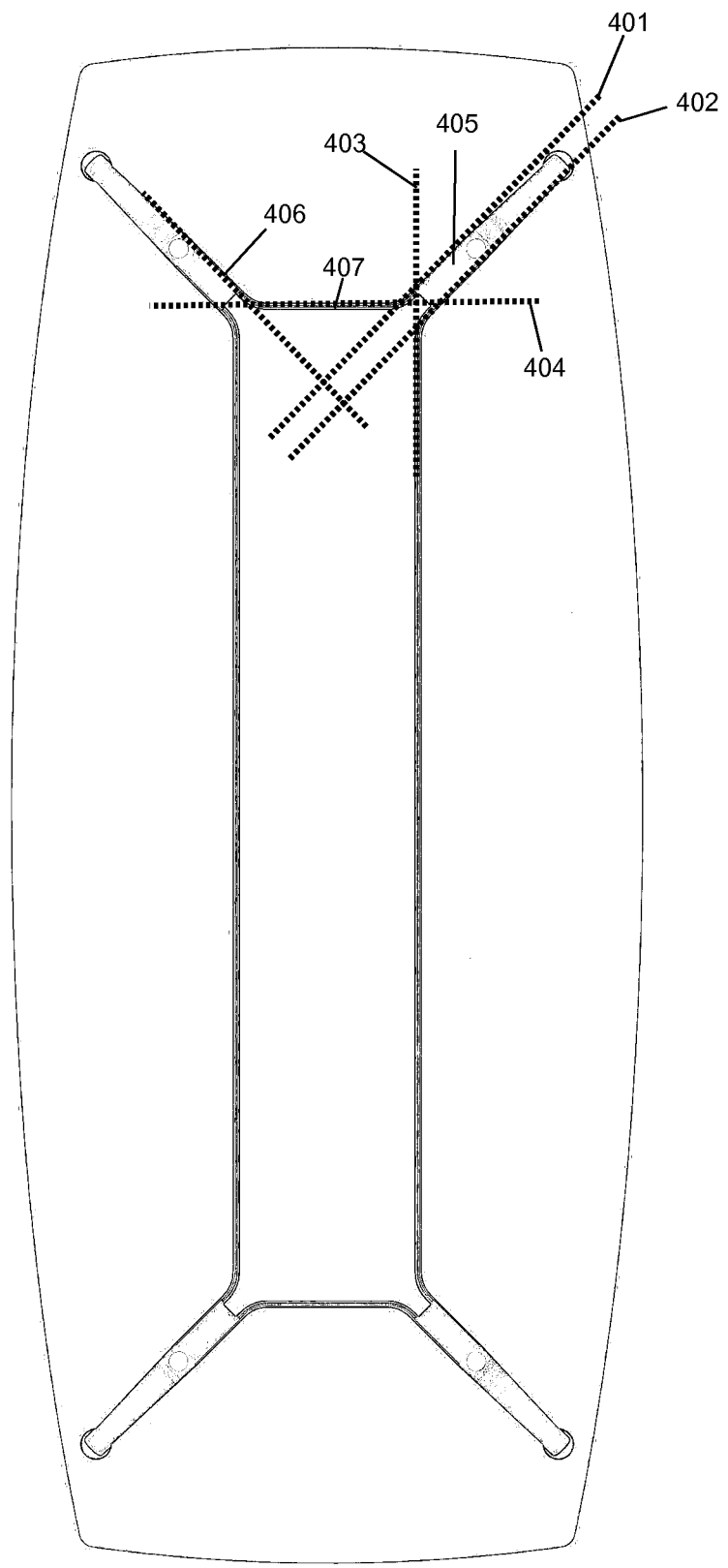
FIG. 27 is a top view of a table having four angled table legs and two bent frame sections extending from each table leg.
Figure 28:
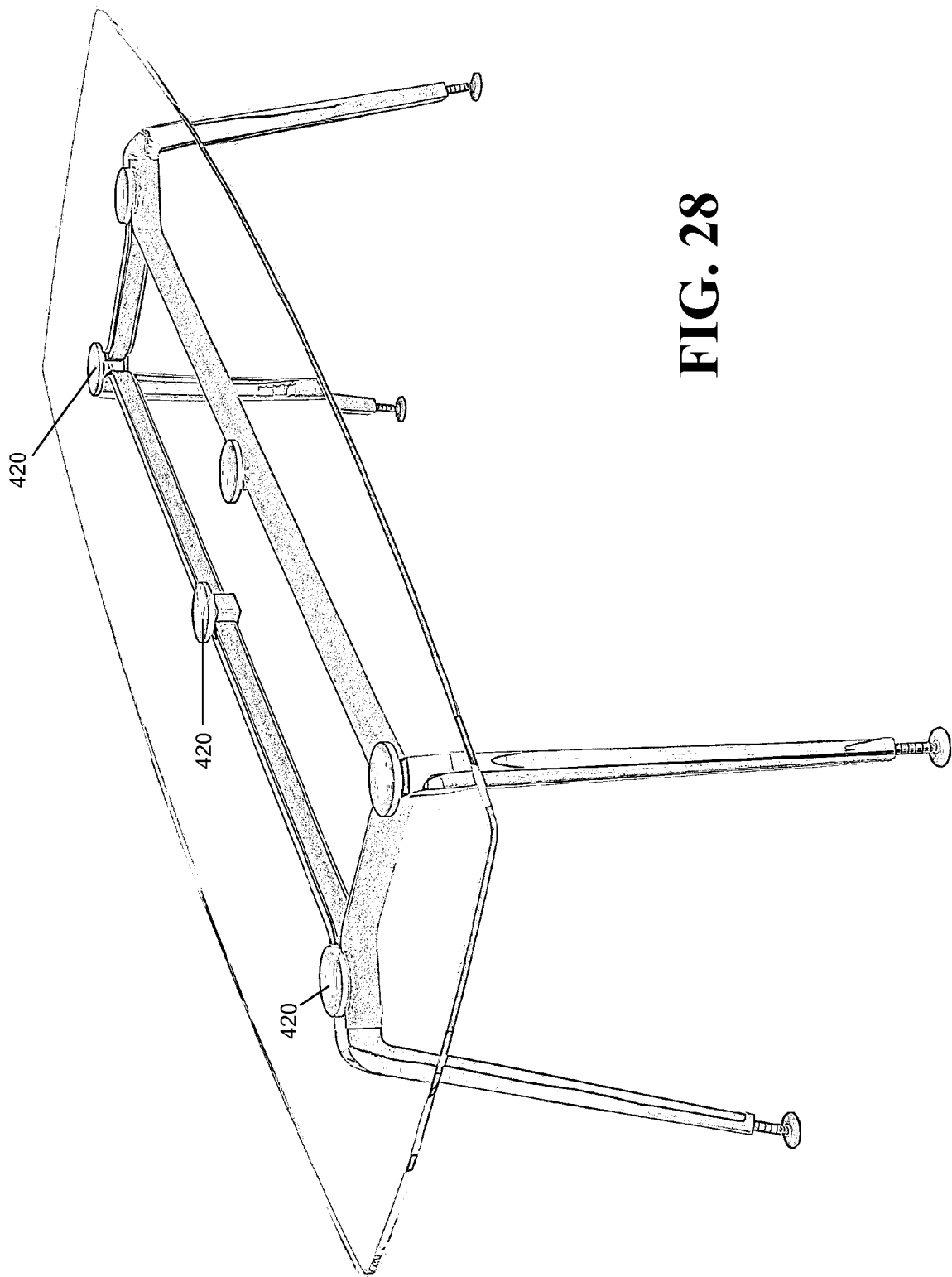
FIG. 28 is a perspective view of a table having four angled table legs, two bent frame sections extending from each table leg, and support structures connecting to the legs and frame sections for supporting the table top.

FIGS. 27 and 28 show tables with four bent frame structures secured to four inclined table legs. FIG. 27 shows a first, second, third and fourth plane (401-404). The portions of the frame sections secured in the clamping mechanism 405 are aligned with parallel planes 401 and 402. Distant from the clamping mechanism, portions of the frame sections are aligned with oblique planes 403 and 404. Portions of frame structures located in the fifth plane 406 are secured to a second table leg and oblique to the first through fourth planes. The top frame section 407 has a first flat side in the first plane 401, a second flat side in the fourth plane 404, and a third flat side in the fifth plane 406. Oblique is herein defined to mean slanting or inclined in direction or course or position, not parallel. Obtuse, acute and right angles are herein defined to be oblique angles. In FIG. 28 support structures 420 are secured to the table legs and the frame structures to support the weight of the table top. The tables of FIGS. 27 and 28 use a minimal number of frame sections to create a table with a refined appearance and a high degree of symmetry.

Figure 29:
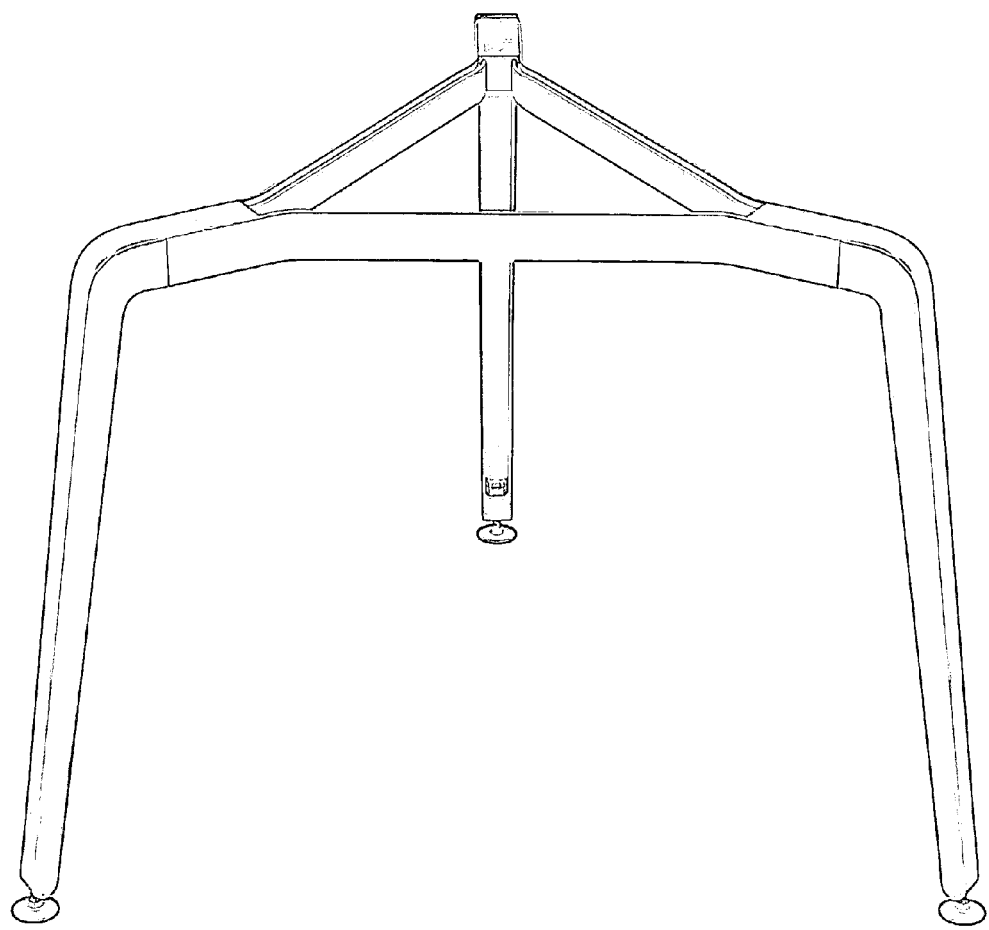
FIG. 29 is a perspective view of a table frame having three angled table legs and two bent frame sections extending from each table leg.

FIG. 29 shows a frame comprising three identical bent frame sections secured to three table legs. The frame may be used for a plurality of different applications such as for a stool, a coffee table, or to support a round table top. Although identical frame sections are shown in FIG. 29, other larger numbers of identical frame sections may be used to create circular frame structures.

Figure 30:
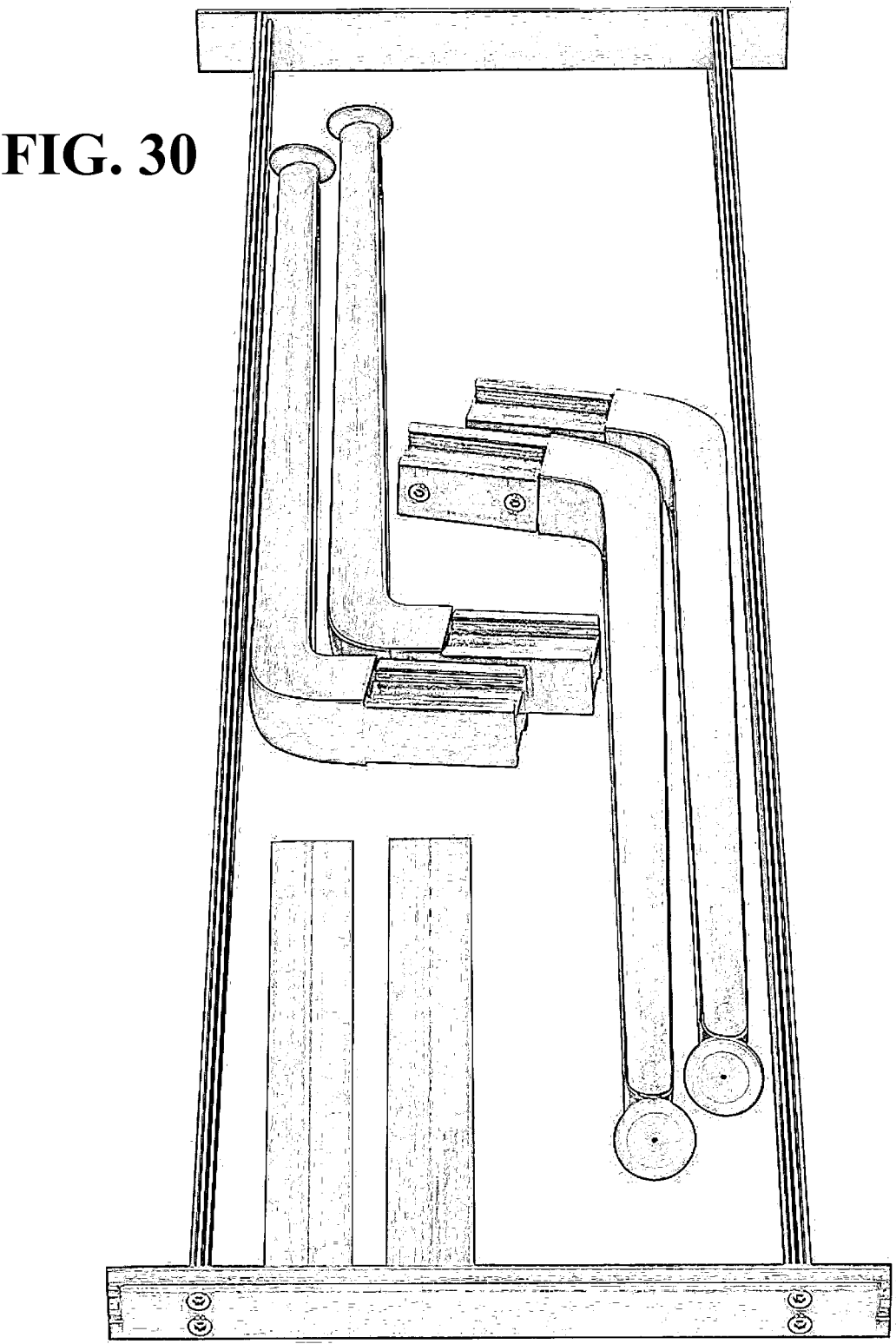
FIG. 30 is a perspective view of a disassembled table frame with four table legs and frame sections perpendicularly intersecting.
Figure 31:
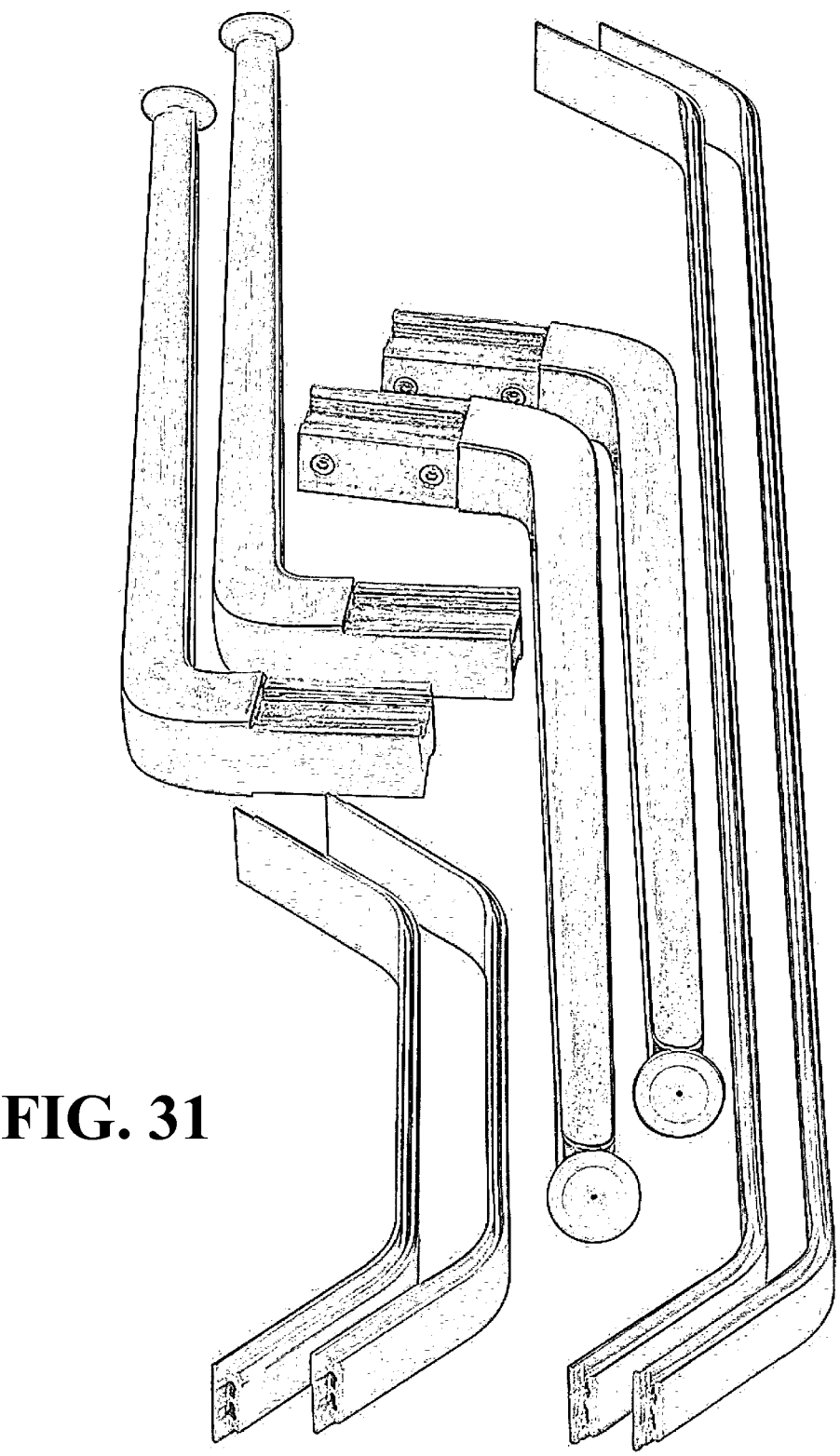
FIG. 31 is a perspective view of a disassembled table frame with four table legs and bent frame sections.

FIGS. 30 and 31 illustrate examples of disassembled frame structures with four inclined lined and linear frame sections or bent frame sections. The integrally formed clamping mechanisms in the table legs reduce the number of individual pieces required to complete a table frame and also reduce the amount of time needed to assemble the table frame. If the end user decides to disassemble the table frame, the integrally formed clamping mechanisms in the table legs reduce the likelihood that a piece of the table frame will be lost or misplaced while in table frame is in storage.

Figure 33:
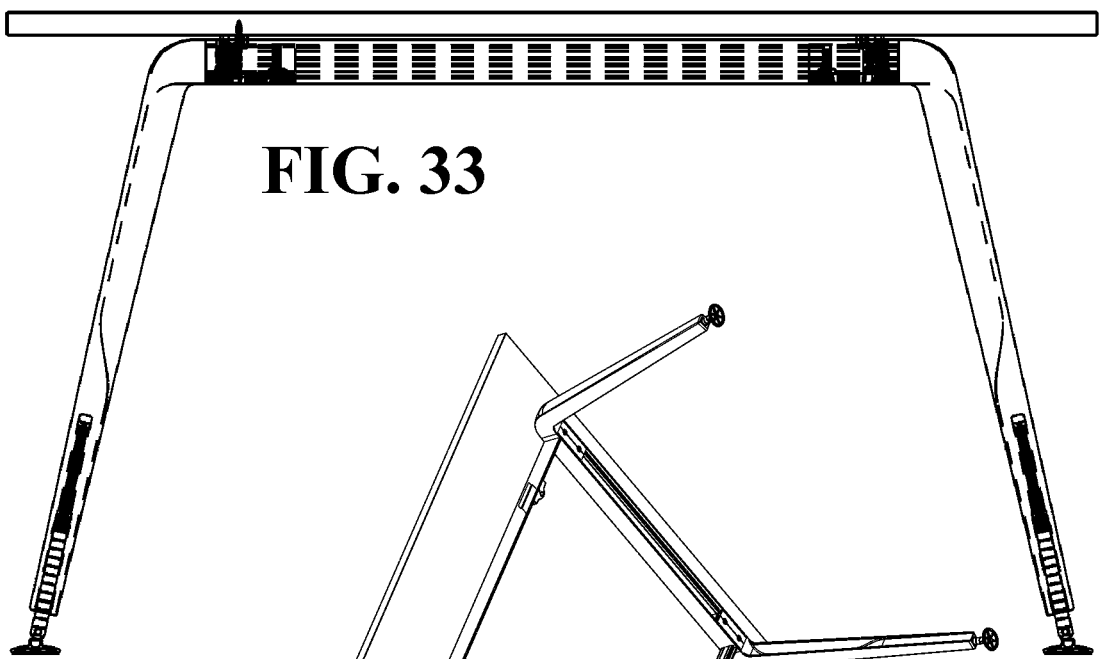
FIG. 33 is a side sectional view of the table system of FIG. 32.
Figure 32:
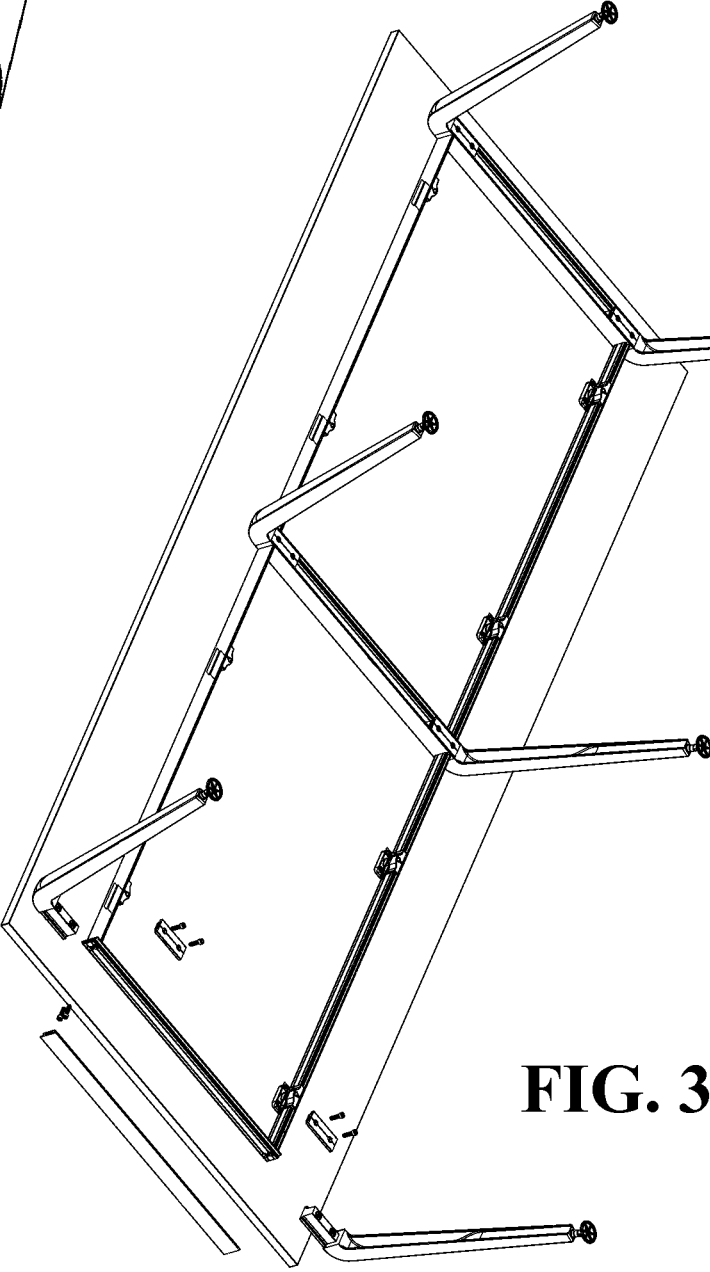
FIG. 32 is an underside perspective view of a table system with six table legs.
Figure 38:
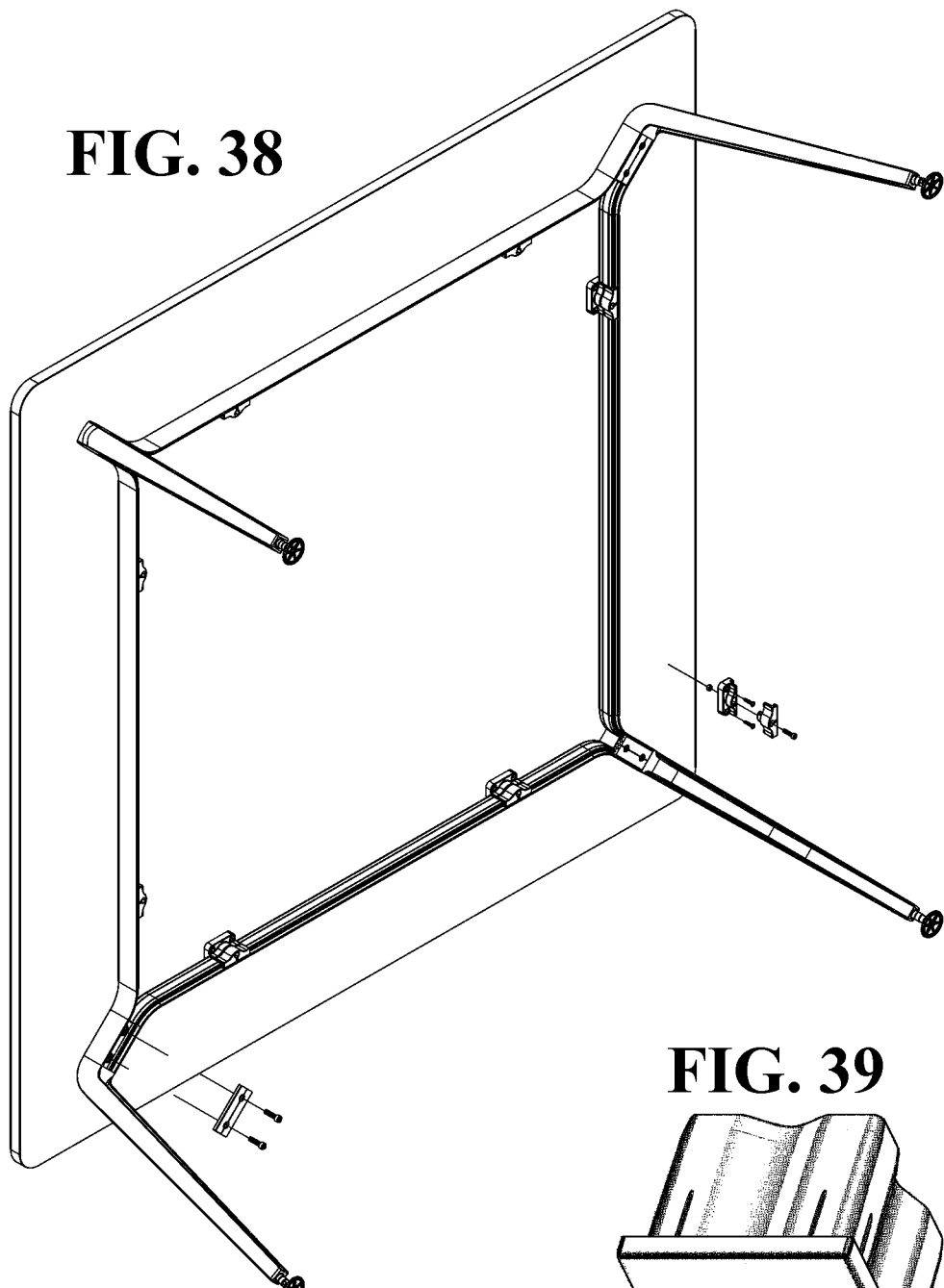
FIG. 38 is an underside perspective view of a table system with four table legs and support structures clamped to the table top.
Figure 39:
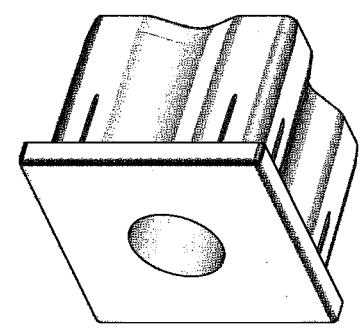
FIG. 39 is a perspective view of a straight leg end cap.
Figures 40, 41:
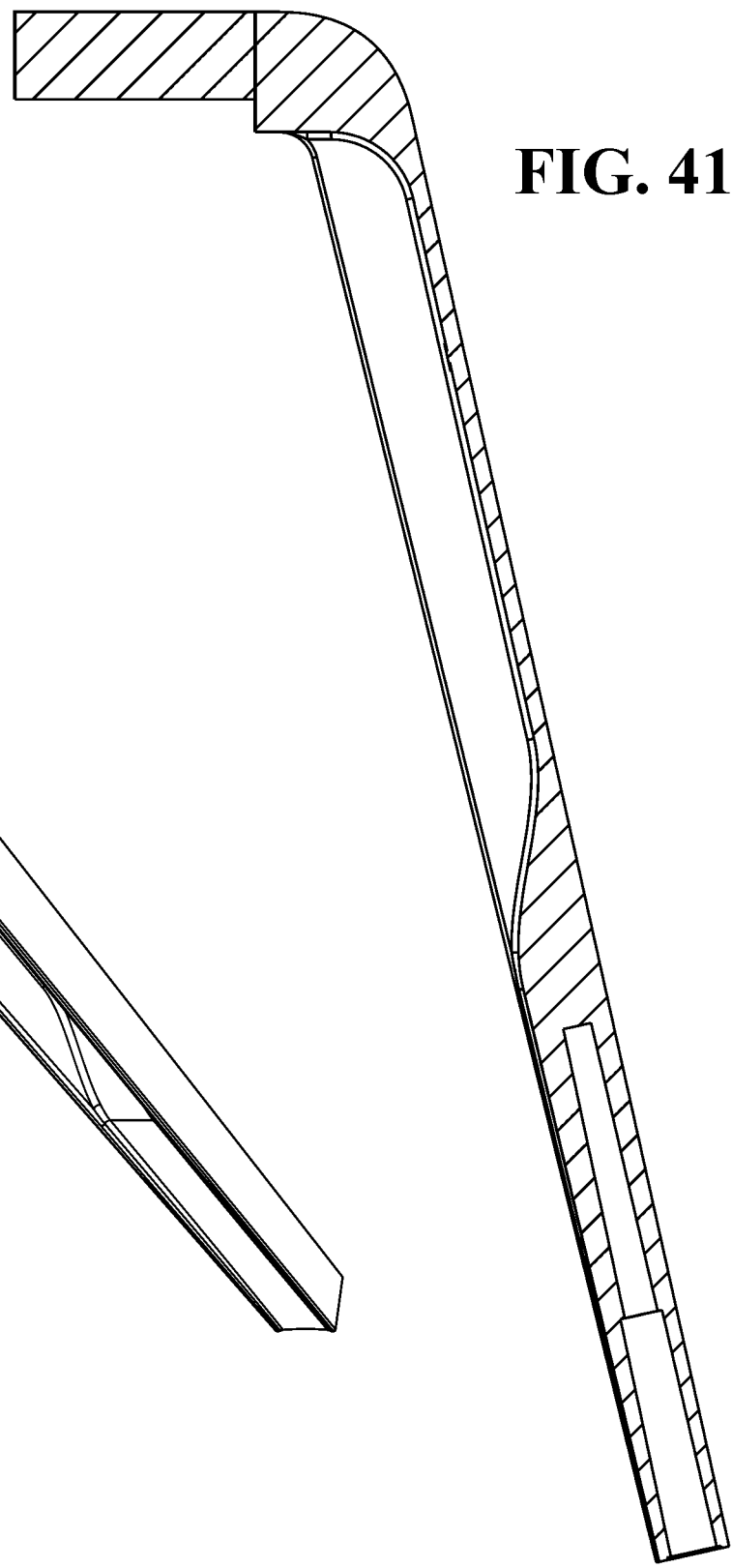
FIG. 40 is a perspective view of an inclined leg.
FIG. 41 is a side cross sectional view of an inclined leg.

FIGS. 32 and 33 illustrate inclined legs connecting to straight frame sections. FIGS. 34 through 37 illustrate straight table legs that may be incorporated into the table system. FIG. 38 shows a table system with inclined legs connecting to bent frame members. FIG. 39 shows a end cap for a straight leg. Inclined legs are shown in FIGS. 40 and 41.

Since a wide variety of table frame configurations may be constructed from the base pieces, significant savings may be realized by manufacturers who benefit from the economy of scale when producing large quantities of the base pieces. Shipping and packaging costs may be reduced for manufacturers by shipping sets of base pieces (such as a set of 100 slanted table legs) to distributers or retail locations instead of shipping packages containing the pieces for a complete table frame. Additionally, the interchangeability of the base pieces reduces the number of replacement parts that must retailers and distributers must have in inventory.

The inventor contemplates several alterations and improvements to the disclosed invention. The frame may further include protective and/or decorative coatings such as paint. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the apparatus described. Instead, the scope of the present invention should be consistent with the invention claimed below.

I claim:

1. A table system comprising
a table top supported by a table frame with a first table leg including a clamping mechanism, the table frame including a first frame section extending parallel to a second frame section at the clamping mechanism, both frame sections clamped to the clamping mechanism;
each of the frame sections further including
a first flat side parallel to a second flat side, the first flat side having a first total surface area and the second flat side having a second total surface area, the first total surface area being smaller than the second total surface area, a first and second terminal side extending from the first flat side to the second flat side,
each terminal side having a groove interlocked with the clamping mechanism;
the clamping mechanism includes
an upper clamping section moveably secured to a lower clamping section by an actuator, each clamping section having a protrusion located within one of the grooves of the first frame section and one of the grooves of the second frame section; and
the first table leg includes
a first flat leg side with a leg vertical edge with a first end and a second end,
wherein both the first end and the second end abut the second flat side of the first frame section.

2. The table system of claim 1 wherein the actuator is a screw.

3. The table system of claim 1
wherein
a vertically oriented shaft of the table leg and one of a group consisting of the upper clamping section and the lower clamping section are constructed from a single continuous member.

4. The table system of claim 1 wherein
the clamping mechanism and two parallely extending frame sections cooperate to have a rectangular cross-section; and
the first flat leg side is bounded by
the leg vertical edge adjacent to the second flat side of the first frame section, and
a rounded edge intersecting the leg vertical edge and extending down the first table leg to a height adjustment unit.

5. The table system of claim 1 wherein both the upper clamping section and the lower clamping sections have T-shaped cross sections.

6. The table system of claim 1 further comprising
the first frame section further including
a third flat side parallel to a fourth flat side,
the first terminal side of the first frame section and the second terminal side of the first frame section extending from the third flat side to the fourth flat side,
the third flat side oblique to the first flat side of the first frame section and spanning from the first terminal side of the first frame section to the second terminal side of the first frame section; and
a portion of the first flat side of the first frame section is adjacent to the clamping mechanism, and
all of the third flat side is directly adjacent to the first table leg.

7. The table system of claim 6 further comprising
the third flat side of the first frame section directly contacting the clamping mechanism of the first table leg.

8. A table system comprising
a table top supported by a table frame with a first table leg including a clamping mechanism, the table frame including a first frame section extending parallel to a second frame section at the clamping mechanism, both frame sections clamped to the clamping mechanism;
each of the frame sections further including
a first flat side parallel to a second flat side, the first flat side having a first total surface area and the second flat side having a second total surface area, the first total surface area being smaller than the second total surface area,
a first and second terminal side extending from the first flat side to the second flat side
each terminal side having a groove interlocked with the clamping mechanism;
the first terminal side of the first frame section comprising:
a first sloped side extending from the first flat side to an apex,
a second sloped side extending from the apex to a longitudinal channel, and
a third sloped side extending away from the a longitudinal channel towards the second flat side; and
the clamping mechanism includes
a horizontally planar surface,
a protrusion defined by
a first angled side extending from a crest of the protrusion to a edge of the horizontally planar surface and
a second angled side extending from the crest away from the edge towards the horizontally planar surface to a valley, and
a third angled surface extending from the valley, away from both the edge and the horizontally planar surface to a vertically planar surface;
wherein
the protrusion is secured within the longitudinal channel,
the apex is secured within the valley,
the first angled side directly contacting the third sloped side,
the second angled side directly contacting the second sloped side,
the third angled side directly contacting the first sloped side, and
the vertically planar surface located adjacent to the first flat side of the first frame section.

9. The table system of claim 8 further comprising
the first frame section further including a third flat side parallel to a fourth flat side,
the first terminal side of the first frame section and the second terminal side of the first frame section extending from the third flat side to the fourth flat side,
the third flat side oblique to the first flat side of the first frame section and spanning from
the first terminal side of the first frame section to the second terminal side of the first frame section; and
a portion of the first flat side of the first frame section is adjacent to the clamping mechanism, and
all of the third flat side is directly adjacent to the first table leg.

10. The table system of claim 9 further comprising
the third flat side of the first frame section directly contacting the clamping mechanism of the first table leg.

11. The table system of claim 8 further comprising
a third frame section perpendicularly secured to the first frame section by a fastener.

12. The table system of claim 11 wherein
the fastener is secured in a threaded longitudinal channel within the third frame section.

13. The table system of claim 8 wherein
the first table leg includes a first flat leg side bounded by
a leg vertical edge adjacent to the first frame section and
a first rounded edge intersecting the leg vertical edge and extending down the first table leg to a height adjustment unit.

14. The table system of claim of claim 13 wherein
the first flat leg side is bounded by a second rounded edge distant from the first rounded edge intersecting the leg vertical edge and
extending down the first table leg to a height adjustment unit.

15. The table system of claim of claim 8 wherein wherein
a vertically oriented shaft of the first table leg,
the horizontally planar surface, and
the protrusion
are constructed from a single continuous member.

16. A frame for supporting a table top surface above a floor, the frame comprising:
a first table leg and a second table leg, each table leg having
a floor plate for contacting the floor;
a first slot bounded by
a first upper horizontal protrusion,
a first lower horizontal protrusion, and
a first vertical edge extending from the first upper horizontal protrusion to the first lower horizontal protrusion;
a second slot aligned parallel to the first slot, the second slot bounded by
a second upper horizontal protrusion,
a second lower horizontal protrusion, and
a second vertical edge extending from the first upper horizontal protrusion to the first lower horizontal protrusion; and securing structural bands,
a first flat exterior leg side bounded by
a first bottom edge near the floor plate,
the first vertical edge, and
a first curved edge extending between and intersecting both the first vertical edge and the first bottom edge;
a clamping mechanism structured to vertically move the second upper horizontal protrusion relative to the second lower horizontal protrusion, and the first upper horizontal protrusion relative to the first lower horizontal protrusion,
a first structural band with
a first band portion secured in the first slot of the first table leg, and
a second band portion secured in the first slot of the second table leg,
the first band portion having a first flat portion side that abuts the first flat exterior leg side of the first table leg only at the first vertical edge of the first table leg, both the first flat portion side and the first flat exterior leg side of the first table leg being coplanar, and
the second band portion having a second flat portion side that abuts the first flat exterior leg side of the second table leg only at the first vertical edge of the second table leg, both the second flat portion side and the first flat exterior leg side of the second table leg being coplanar.

17. The frame of claim 16 further comprising
the first flat exterior leg side of the first table leg further bounded by a second curved edge extending between and intersecting both the first vertical edge of the first table leg and the first bottom edge of the first table leg.

18. The frame of claim 16 further wherein
the first table leg includes
a second flat exterior leg side bounded by
a second bottom edge near the floor plate of the first table leg,
a second vertical edge, and
a second curved edge extending between and intersecting both the second vertical edge and the second bottom edge.

19. The frame of claim 18 wherein
the second flat exterior leg side of the first table leg is parallel to the first flat exterior leg side of the first table leg.

* * * * *